US009070370B2

(12) United States Patent
Bonada et al.

(10) Patent No.: US 9,070,370 B2
(45) Date of Patent: Jun. 30, 2015

(54) TECHNIQUE FOR SUPPRESSING PARTICULAR AUDIO COMPONENT

(75) Inventors: Jordi Bonada, Barcelona (ES); Jordi Janer, Barcelona (ES); Ricard Marxer, Barcelona (ES); Yasuyuki Umeyama, Hamamatsu (JP); Kazunobu Kondo, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 804 days.

(21) Appl. No.: 13/284,199

(22) Filed: Oct. 28, 2011

(65) Prior Publication Data

US 2012/0106758 A1 May 3, 2012

(30) Foreign Application Priority Data

Oct. 28, 2010 (JP) ................................ 2010-242244
Mar. 3, 2011 (JP) ................................ 2011-045974

(51) Int. Cl.
*H04B 15/00* (2006.01)
*G10L 21/0272* (2013.01)
(Continued)

(52) U.S. Cl.
CPC ............... *G10L 21/0272* (2013.01); *H04S 7/40* (2013.01); *G10L 25/90* (2013.01); *H04S 7/30* (2013.01); *H04S 2400/11* (2013.01); *H04S 2420/07* (2013.01); *G10L 2021/02087* (2013.01);
(Continued)

(58) Field of Classification Search
CPC ............. G10H 3/125; H04S 7/30; H04S 7/40; G10L 25/90
See application file for complete search history.

(56) References Cited

U.S. PATENT DOCUMENTS 7,092,881 B1 * 8/2006 Aguilar et al. ................ 704/233
8,219,390 B1 * 7/2012 Laroche ........................ 704/207
(Continued)

FOREIGN PATENT DOCUMENTS

EP 1 640 973 A2 3/2006
JP 4-296200 A 10/1992
(Continued)

OTHER PUBLICATIONS

Extended European Search Report Dated Oct. 7, 2013 (five (5) pages).

(Continued)

*Primary Examiner* — Joseph Saunders, Jr.
*Assistant Examiner* — James Mooney
(74) *Attorney, Agent, or Firm* — Crowell & Moring LLP

(57) ABSTRACT

A coefficient train processing section, which sequentially generates per unit segment a processing coefficient train for suppressing a target component of an audio signal, includes a basic coefficient train generation section and coefficient train processing section. The basic coefficient train generation section generates a basic coefficient train where basic coefficient values corresponding to frequencies within a particular frequency band range are each set at a suppression value that suppresses the audio signal while coefficient values corresponding to frequencies outside the particular frequency band range are each set at a pass value that maintains the audio signal. The coefficient train processing section generates the processing coefficient train, per unit segment, by changing, to the pass value, each of the coefficient values corresponding to frequencies other than the target component among the coefficient values corresponding to the frequencies within the particular frequency band range.

14 Claims, 15 Drawing Sheets

(51) Int. Cl.

| | |
|---|---|
| ***G10H 1/36*** | (2006.01) |
| *H04S 7/00* | (2006.01) |
| *G10L 25/90* | (2013.01) |
| *G10L 21/0208* | (2013.01) |

(52) U.S. Cl.

CPC ............ *G10L21/0208* (2013.01); *G10H 1/361* (2013.01); *G10H 2210/066* (2013.01); *G10H 2210/331* (2013.01); *G10H 2250/021* (2013.01); *G10H 2250/031* (2013.01)

(56) References Cited

U.S. PATENT DOCUMENTS

| | | | | |
|---|---|---|---|---|
| 2003/0118192 | A1 | 6/2003 | Sasaki | |
| 2005/0143983 | A1 * | 6/2005 | Chang et al. | 704/218 |
| 2006/0067541 | A1 * | 3/2006 | Yamada et al. | 381/98 |
| 2007/0110258 | A1 | 5/2007 | Kimijima | |
| 2007/0147623 | A1 | 6/2007 | Kim et al. | |
| 2008/0201138 | A1 * | 8/2008 | Visser et al. | 704/227 |
| 2008/0202321 | A1 * | 8/2008 | Goto et al. | 84/616 |

FOREIGN PATENT DOCUMENTS

| | | | |
|---|---|---|---|
| JP | 2002-44793 | A | 2/2002 |
| JP | 2002-78100 | A | 3/2002 |
| JP | 2002-199500 | A | 7/2002 |
| JP | 3670562 | B2 | 7/2005 |
| JP | 2007-135046 | A | 5/2007 |
| JP | 2009-188971 | A | 8/2009 |
| WO | WO 2008/122974 | A1 | 10/2008 |

OTHER PUBLICATIONS

A. P. Klapuri, “Multiple fundamental frequency estimation based on harmonicity and spectral smoothness”, IEEE Transactions on Speech and Audio Processing, Nov. 2003, vol. 11, No. 6, pp. 804-816 (Fourteen (14) pages).

A. Roebel, “Onset Detection in Polyphonic Signals by means of Transient Peak Classification”, IRCAM, 1, place Igor Stravinsky 75004, Paris France, roebel@ircam.fr (Six (6) pages).

M. Vinyes et al., “Demixing Commercial Music Productions via Human-Assisted Time-Frequency Masking”, Audio Engineering Society, Convention Paper, 120$^{th}$ Convention, May 20-23, 2006, pp. 1-9, Paris, France.

Japanese Office Action dated Mar. 31, 2015 with English-language translation (8 pages).

* cited by examiner

TECHNIQUE FOR SUPPRESSING PARTICULAR AUDIO COMPONENT

BACKGROUND

The present invention relates to a technique for selectively suppressing a particular audio component (hereinafter referred to as "target component") from an audio signal.

Heretofore, various techniques have been proposed for suppressing a particular target component from an audio signal. Japanese Patent No. 3670562 (hereinafter referred to as "patent literature 1") and Japanese Patent Application Laid-open Publication No. 2009-188971 (hereinafter referred to as "patent literature 2"), for example, discloses a technique for suppressing a front (central) localized component by multiplying individual frequency components of an audio signal by coefficient values (or attenuation coefficients) preset for individual frequencies in accordance with a degree of similarity between right-channel and left-channel audio signals of the audio signal.

However, with the technique disclosed in patent literature 1 and patent literature 2, all of localized components in a predetermined direction are uniformly suppressed, and thus, it was not possible to selectively suppress an audio component of a particular sound image from an audio signal generated in such a manner that a plurality of sound images are localized in a target direction.

SUMMARY OF THE INVENTION

In view of the foregoing prior art problems, the present invention seeks to provide a technique for suppressing a target component of an audio signal while maintaining other components than the target component.

In order to accomplish the above-mentioned object, the present invention provides an improved audio processing apparatus for generating, for each of unit segments of an audio signal, a processing coefficient train having coefficient values set for individual frequencies such that a target component of the audio signal is suppressed, which comprises: a basic coefficient train generation section which generates a basic coefficient train where basic coefficient values corresponding to individual frequencies included within a particular frequency band range are each set at a suppression value that suppresses the audio signal while basic coefficient values corresponding to individual frequencies outside the particular frequency band range are each set at a pass value that maintains the audio signal; and a coefficient train processing section which generates the processing coefficient train for each of the unit segments by changing, to the pass value, each of the basic coefficient values included in the basic coefficient train generated by the basic coefficient train generation section and corresponding to individual frequencies other than the target component among the coefficient values corresponding to the individual frequencies included within the particular frequency band range.

With the aforementioned arrangements, each of the coefficient values included in the basic coefficient train generated by the basic coefficient train generation section and corresponding to individual frequencies that in turn correspond to the other audio components than the target component among the basic coefficient values corresponding to the individual frequencies included within the particular frequency band range is set at the pass value. Thus, the present invention can suppress the target component while maintaining the other audio components than the target component among the audio components included within the particular frequency band range of the audio signal; namely, the present invention can selectively suppress the target component with an increased accuracy and precision.

In a preferred embodiment, the coefficient train processing section includes a sound generation point analysis section which processes the basic coefficient train, having been generated by the basic coefficient train generation section, in such a manner that, over a predetermined time period from a sound generation point of any one of the frequency components included within the particular frequency band range, the basic coefficient values corresponding to a frequency of the one frequency component included within the particular frequency band range of the audio signal are each set at the pass value. Because the coefficient values corresponding to a frequency component included within the particular frequency band range of the audio signal are each set at the pass value over the predetermined time period from a sound generation point of the frequency component included within the particular frequency band range, the present invention can maintain, even after execution of a component suppression process, a particular audio component, such as a percussion instrument sound, having a distinguished or prominent sound generation point within the particular frequency band range.

In a preferred embodiment, the basic coefficient train generation section generates a basic coefficient train where basic coefficient values corresponding to individual frequencies of components localized in a predetermined direction within the particular frequency band range are each set at the suppression value while coefficient values corresponding to other frequencies than the frequencies of the components localized in the predetermined direction are each set at the pass value. Because the basic coefficient values set at the suppression value in the basic coefficient train are selectively limited to those corresponding to the components localized in the predetermined direction within the particular frequency band range, the present invention can selectively suppress the target component, localized in the predetermined direction, with an increased accuracy and precision.

Preferably, the audio processing apparatus of the present invention may further comprise a storage section storing therein a time series of reference tone pitches. In this case, for each of sound generation points corresponding to the time series of reference tone pitches among the sound generation points of the individual frequency components included within the particular frequency band range, the sound generation point analysis section sets the coefficient values at the suppression value even in the predetermined time period. Because, for each of the sound generation points corresponding to the time series of reference tone pitches (i.e., for each of the sound generation points of the target component), the coefficient values are set at the suppression value, the present invention can suppress the target component with an increased accuracy and precision. This preferred embodiment will be discussed later as a third embodiment of the present invention.

In a preferred embodiment, the coefficient train processing section includes a fundamental frequency analysis section which identifies, as a target frequency, a fundamental frequency having a high degree of likelihood of corresponding to the target component from among a plurality of fundamental frequencies identified, for each of the unit segments, with regard to the frequency components included within the particular frequency band range of the audio signal and which processes the basic coefficient train, having been generated by the basic coefficient train generation section, in such a manner that the basic coefficient values corresponding to other fundamental frequencies than the target frequency among the plurality of fundamental frequencies and harmonics frequencies of each of the other fundamental frequencies are each set at the pass value. Because the coefficient values of each of the other fundamental frequencies than the target frequency among the plurality of fundamental frequencies identified from the particular frequency band range and harmonics frequencies of each of the other fundamental frequencies are each set at the pass value, the present invention can maintain the other audio components than the target component, which have harmonics structures within the particular frequency band range, even after the execution of the component suppression process.

In a preferred embodiment, the fundamental frequency analysis section includes: a frequency detection section which identifies, for each of the unit segments, a plurality of fundamental frequencies with regard to frequency components included within the particular frequency band range of the audio signal; a transition analysis section which identifies a time series of the target frequencies from among the plurality of fundamental frequencies, identified for each of the unit segments by the frequency detection section, through a path search based on a dynamic programming scheme; and a coefficient train setting section which processes the basic coefficient train in such a manner that the basic coefficient values of each of the other fundamental frequencies than the target frequencies, identified by the transition analysis section, among the plurality of fundamental frequencies and harmonics frequencies of each of the other fundamental frequencies are each set at the pass value. By using the path search based on the dynamic programming scheme, the present invention can advantageously identify a time series of the target frequencies while reducing the quantity of necessary arithmetic operations. Further, by the use of the dynamic programming scheme, the present invention can achieve a robust path search against instantaneous lack and erroneous detection of the fundamental frequency.

In a preferred embodiment, the frequency detection section calculates a degree of likelihood with which a frequency component corresponds to any one of the fundamental frequencies of the audio signal and selects, as the fundamental frequencies, a plurality of frequencies having a high degree of the likelihood, and the transition analysis section calculates, for each of the fundamental frequencies, a first probability corresponding to the degree of likelihood, and identifies a time series of the target frequencies through a path search using the first probability calculated for each of the fundamental frequencies. Because a time series of the target frequencies is identified by use of the first probabilities corresponding to the degrees of the likelihood of the fundamental frequencies detected by the frequency detection section, the present invention can advantageously suppress the target component of a harmonics structure having a prominent fundamental frequency within the particular frequency band range.

In a preferred embodiment, the audio processing apparatus of the present invention may further comprise an index calculation section which calculates, for each of the unit segments, a characteristic index value indicative of similarity and/or dissimilarity between an acoustic characteristic of each of harmonics structures corresponding to the plurality of fundamental frequencies and an acoustic characteristic corresponding to the target component, and the transition analysis section calculates, for each of the fundamental frequencies, a second probability corresponding to the characteristic index value and identifies a time series of the target frequencies using the second probability calculated for each of the fundamental frequencies. Because a time series of the target frequencies is identified by use of the second probabilities corresponding to the characteristic index values, the present invention can evaluate the fundamental frequency corresponding to the target component with an increased accuracy and precision from the perspective or standpoint of similarity and/or dissimilarity of acoustic characteristics.

In a preferred embodiment, the transition analysis section calculates, for adjoining ones of the unit segments, third probabilities with which transitions occur from individual fundamental frequencies of one of the adjoining unit segments to fundamental frequencies of another one of the unit segments, immediately following the one adjoining unit segments, in accordance with differences between respective ones of the fundamental frequencies of the adjoining unit segments, and then identifies a time series of the target frequencies through a path search using the third probabilities. Because a time series of the target frequencies is identified by use of the third probabilities corresponding to the differences between the fundamental frequencies in the adjoining unit segments, the present invention can advantageously reduce a possibility of a path where the fundamental frequencies vary extremely being erroneously detected.

In a preferred embodiment, the transition analysis section includes: a first processing section which identifies a time series of the fundamental frequencies, on the basis of the plurality of fundamental frequencies for each of the unit segments, through the path search based on a dynamic programming scheme; and a second processing section which determines, for each of the unit segments, presence or absence of the target component in the unit segment. Of the time series of the fundamental frequencies identified by the first processing section, a fundamental frequency of each of the unit segments for which the second processing section has affirmed presence therein of the target component is identified as the target frequency. Because, of the time series of the fundamental frequencies, the fundamental frequency of each unit segment for which the second processing section has affirmed presence therein of the target component is identified as the target frequency, the present invention can identify transitions of the target component with an increased accuracy and precision, as compared to a construction where the transition analysis section includes only the first processing section.

In a preferred embodiment, the audio processing apparatus of the present invention may further comprise a storage section storing therein a time series of reference tone pitches, and a tone pitch evaluation section which calculates, for each of the unit segments, a tone pitch likelihood corresponding to a difference between each of the plurality of fundamental frequencies identified by the frequency detection section for the unit segment and the reference tone pitch corresponding to the unit segment. In this case, the first processing section identifies, for each of the plurality of fundamental frequencies, an estimated path through a path search using the tone pitch likelihood calculated for each of the unit segments, and the second processing section identifies a state train through a path search using probabilities of a sound-generating state and a non-sound-generating state calculated for each of the unit segments in accordance with the tone pitch likelihoods corresponding to the fundamental frequencies on the estimated path. Because the tone pitch likelihoods corresponding to the differences between the fundamental frequencies detected by the frequency detection section and the reference tone pitches are applied to the path searches by the first and second processing sections, the present invention can identify the fundamental frequency of the target component with an increased accuracy and precision. This preferred embodiment will be discussed later as a fifth embodiment of the present invention.

In a preferred embodiment, the coefficient train processing section includes a sound generation analysis section which determines presence or absence of the target component per analysis portion comprising a plurality of the unit segments and which generates the processing coefficient train where all of the coefficient values are set at the pass value for any of the unit segments within each of the analysis portions for which the second processing section has negated the presence therein of the target component. Because the sound generation analysis section generates the processing coefficient train where all of the coefficient values are set at the pass value for the unit segments (e.g., unit segment located centrally) within each of the analysis portions for which the second processing section has negated the presence of the target component, the present invention can advantageously avoid partial lack of the audio signal in the unit segment where the target component does not exist. This preferred embodiment will be discussed later as a second embodiment of the present invention.

The audio processing apparatus of the present invention may further comprise a storage section storing therein a time series of reference tone pitches, and a correction section which corrects a fundamental frequency, indicated by frequency information, by a factor of 1/1.5 when the fundamental frequency indicated by the frequency information is within a predetermined range including a frequency that is one and half times as high as the reference tone pitch at a time point corresponding to the frequency information and which corrects the fundamental frequency, indicated by the frequency information, by a factor of ½ when the fundamental frequency is within a predetermined range including a frequency that is two times as high as the reference tone pitch. Because the fundamental frequency indicated by frequency information is corrected in accordance with the reference tone pitch, a five-degree error, octave-error or the like can be corrected, and thus, the present invention can advantageously identify the fundamental frequency of the target component with an increased accuracy and precision. This preferred embodiment will be discussed later as a sixth embodiment of the present invention.

The aforementioned various embodiments of the audio processing apparatus can be implemented not only by hardware (electronic circuitry), such as a DSP (Digital Signal Processor) dedicated to generation of the processing coefficient train but also by cooperation between a general-purpose arithmetic processing device and a program.

The present invention may be constructed and implemented not only as the apparatus discussed above but also as a computer-implemented method and a storage medium storing a software program for causing a computer to perform the method. According to such a software program, the same behavior and advantageous benefits as achievable by the audio processing apparatus of the present invention can be achieved. The software program of the present invention is provided to a user in a computer-readable storage medium and then installed into a user's computer, or delivered from a server apparatus to a user via a communication network and then installed into a user's computer.

The following will describe embodiments of the present invention, but it should be appreciated that the present invention is not limited to the described embodiments and various modifications of the invention are possible without departing from the fundamental principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

A. First Embodiment

Figure 1:
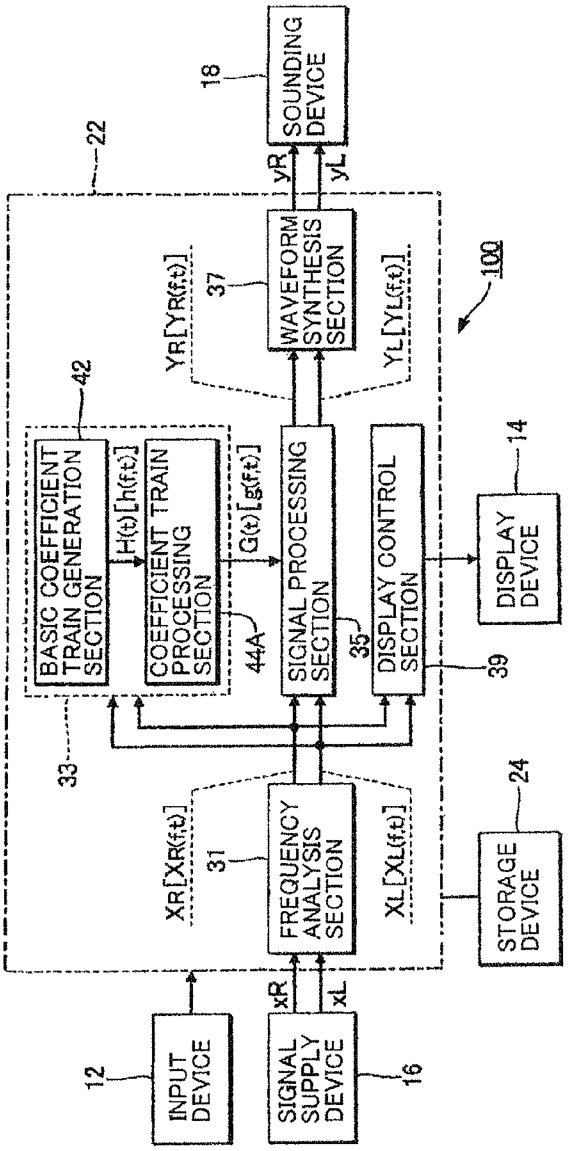
FIG. 1 is a block diagram showing a first embodiment of an audio processing apparatus of the present invention.

FIG. 1 is a block diagram showing a first embodiment of an audio processing apparatus 100 of the present invention, to which are connected an input device 12, a display device 14, a signal supply device 16 and a sounding device 18. The input device 12 includes operation controls operable by a human operator or user (i.e., capable of receiving instructions from the user). The display device 14, which is for example in the form of a liquid crystal display device, displays images in accordance with instructions given from the audio processing apparatus 100.

The signal supply device 16 supplies the audio processing apparatus 100 with an audio signal x ($x_L$, $x_R$) representative of a time waveform of a mixed sound of a plurality of audio components (such as singing and accompaniment sounds) generated by sound sources placed at different positions. The left-channel audio signal $x_L$ and right-channel audio signal $x_R$ are stereo signals picked up and processed (e.g., subjected to a process for artificially manipulating a left/right amplitude ratio using a mixer or the like) in such a manner that sound images corresponding to the sound sources of the individual audio components are localized at different positions, i.e. in such a manner that amplitudes and phases of the audio components differ among the sound sources depending on the positions of the sound sources. As the signal supply device 16 can be employed a sound pickup device (stereo microphone) that picks up ambient sounds to generate an audio signal x, a reproduction device that acquires an audio signal x from a portable or built-in recording medium to supply the acquired audio signal x to the audio processing apparatus 100, or a communication device that receives an audio signal x from a communication network to supply the received audio signal x to the audio processing apparatus 100.

The audio processing apparatus 100 generates an audio signal y ($y_L$ and $y_R$) on the basis of the audio signal x supplied by the signal supply device 16. The left-channel audio signal yL and right-channel audio signal yR are stereo audio signals in which a particular audio component (hereinafter referred to as "target component") on the basis of the audio signal x is suppressed relative to the other audio components. More specifically, of the audio signal x, the target component whose sound image is localized in a predetermined direction is suppressed. The following description assumes a case where a singing sound (voice) included in the audio signal x is suppressed as the target component. The sounding device 18 (such as stereo speakers or stereo headphones) radiates sound waveforms corresponding to the audio signal y ($y_L$ and $y_R$) generated by the audio processing apparatus 100.

As shown in FIG. 1, the audio apparatus 100 is implemented by a computer system comprising an arithmetic processing device 22 and a storage device 24. The storage device 24 stores therein programs to be executed by the arithmetic processing device 22 and various information to be used by the arithmetic processing device 22. As an alternative, the audio signal y ($x_L$ and $x_R$) too may be stored in the storage device 24, in which case the signal supply device 16 may be dispensed with.

By executing any of the programs stored in the storage device 24, the arithmetic processing device 22 performs a plurality of functions (such as functions of a frequency analysis section 31, coefficient train generation section 33, signal processing section 35, waveform synthesis section 37 and display control section 39) for generating the audio signal y from the audio signal x. Alternatively, the individual functions of the arithmetic processing device 22 may be performed in a distributed manner by a plurality of separate integrated circuits, or by dedicated electronic circuitry (DSP).

The frequency analysis section 31 divides or segments the audio signal x into a plurality of unit segments (frames) by sequentially multiplying the audio signal x by a window function, and generates respective frequency spectra $X_L$ and $X_R$ of audio signals $x_L$ and $x_R$ sequentially for each of the unit segments. The frequency spectra $X_L$ are complex spectra represented by a plurality of frequency components $X_L$ (f,t) corresponding to different frequencies (frequency bands) f. Similarly, the frequency spectra $X_R$ are complex spectra represented by a plurality of frequency components $X_R$ (f,t) corresponding to different frequencies (frequency band) f. "t" indicates time (e.g., Nos. of the unit segments Tu). Generation of the frequency spectra $X_L$ and $X_R$ may be performed using, for example, by any desired conventionally-known frequency analysis, such as the short-time Fourier transform.

The coefficient train generation section 33 generates, for each of the unit segments (i.e., per unit segment) Tu, a processing coefficient train G(t) for suppressing a target component from the audio signal x. The processing coefficient train G(t) comprises a plurality of series of coefficient values g(f,t) corresponding to different frequencies f. The coefficient values g(f,t) represent gains (spectral gains) for the frequency components $X_L$ (f,t) of the audio signal $x_L$ and frequency components $X_R$ (f,t) of the audio signal $x_R$, and the coefficient values g(f,t) are variably set in accordance with characteristics of the audio signal x. More specifically, of the processing coefficient train G(t), the coefficient value g(f,t) of (i.e., corresponding to) a frequency f estimated have a target component in the audio signal x is set at a value γ0 (hereinafter referred to as "suppression value γ0") that suppresses the intensity of the audio signal x. The coefficient value g(f,t) of each frequency f estimated to not have a target component in the audio signal x, on the other hand, is set at a value γ1

(hereinafter referred to as "pass value γ1") that maintains the intensity of the audio signal x. The suppression value γ0 is for example "0", while the pass value γ1 is for example "1".

The signal processing section 35 generates, for each of the unit segments (i.e., per unit segment) Tu, frequency spectra $Y_L$ of the audio signal $y_L$ and frequency spectra $Y_R$ of the audio signal $x_R$ through a process for causing the processing coefficient train G(t), generated by the coefficient train generation section 33, to act on each of the frequency spectra $X_L$ and $X_R$ (this process will hereinafter referred to as "component suppression process"). The processing coefficient train G(t), generated by the coefficient train generation section 33 for each of the unit segments Tu, is applied to the component suppression process to be performed on the frequency spectra $X_L$ and frequency spectra $X_R$ of the unit segment Tu. Namely, the signal processing section 35 applies the processing coefficient train G(t) to the component suppression process after having delayed the frequency spectra $X_L$ and frequency spectra $X_R$ by a time necessary for the generation, by the coefficient train generation section 33, of the processing coefficient train G(t).

In the instant embodiment, the component suppression process is performed by multiplying the frequency spectra $X_L$ and frequency spectra $X_R$ by the processing coefficient train G(t). More specifically, by execution of the component suppression process, each frequency component $Y_L(f,t)$ of the audio signal $y_L$ is set at a product value between a frequency component $X_L(f,t)$ of the audio signal $x_L$ and the coefficient value g(f,t) of the processing coefficient train G(t), as shown in mathematical expression (1a) below. Similarly, by the execution of the component suppression process, each frequency component $Y_R(f,t)$ of the audio signal $y_R$ is set at a product value between a frequency component $X_R(f,t)$ of the audio signal $x_R$ and the coefficient value g(f,t) of the processing coefficient train G(t), as shown in mathematical expression (1b) below.

$$YL(f,t)=g(f,t)\cdot XL(f,t) \tag{1a}$$

$$YR(f,t)=g(f,t)\cdot XR(f,t) \tag{1b}$$

Of the audio signal $x_L$, as seen from mathematical expression (1a) above, an audio component corresponding to a frequency component $X_L(f,t)$ of a frequency f for which the coefficient value g(f,t) has been set at the suppression value γ0 (namely, target component) is suppressed by the component suppression process, while each audio component corresponding to a frequency component $X_L(f,t)$ of a frequency f for which the coefficient value g(f,t) has been set at the pass value γ1 (namely, each audio component other than the target component) is caused to pass through the component suppression process, i.e. is maintained without being suppressed by the component suppression process. Similarly, a target component of the audio signal $x_R$ is suppressed by the component suppression process, while each audio component other than the target component of the audio signal $x_R$ is caused to pass through the component suppression process without being suppressed.

Further, the waveform synthesis section 37 of FIG. 1 generates stereo audio signals $y_L$ and $y_R$ on the basis of the frequency spectra $Y_L$ and $Y_R$ generated by the signal processing section 35. More specifically, the waveform synthesis section 37 generates an audio signal $y_L$ by not only converting the frequency spectra $Y_L$ of each of the unit segments Tu into a time-domain waveform signal but also interconnecting the converted time-domain waveform signals of adjoining unit segments Tu. In a similar manner, the waveform synthesis section 37 generates a time-domain audio signal $y_R$ on the basis of the frequency spectra $Y_R$ of each of the unit segments Tu. The audio signal y ($y_L$, $y_R$) generated by the waveform synthesis section 37 is supplied to the sounding device 18 so that they are audibly reproduced as sound waves.

Figure 2:
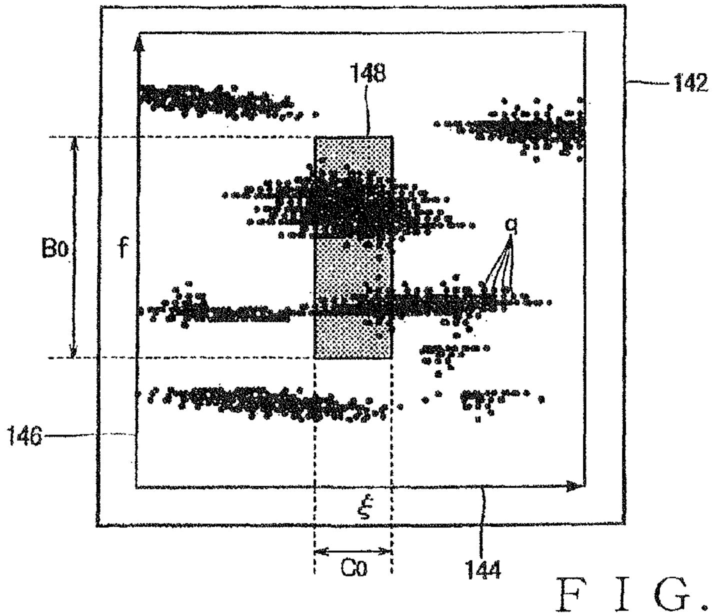
FIG. 2 is a schematic diagram showing a localization image displayed on a display device in the first embodiment of the audio processing apparatus.

The display control section 39 of FIG. 1 generates a localization image 142 of FIG. 2 for reference by a user to designate a desired target component and causes the display device 14 to display the generated localization image. The localization image 142 is an image where a plurality of sound image points q are placed within a plane defined by a localization axis (horizontal axis) 144 and a frequency axis (vertical axis) 146 intersecting with each other. Sound image points q corresponding to positions ξ on the localization axis 144 and frequencies f mean that frequency components of frequencies f that are localized from a predetermined reference point (e.g., recording point of the audio signal x) in a direction of the positions ξ are present in the audio signal x.

The display control section 39 calculates the position ξ of each of the sound image points q corresponding to the frequencies f, using mathematical expression (2) below. "$|X_L(f,t)|$" in mathematical expression (2) represents an amplitude of a frequency component $X_L(f,t)$ of the audio signal $X_L$, and "$|X_R(f,t)|$" in mathematical expression (2) represents an amplitude of a frequency component $X_L(f,t)$ of the audio signal $X_R$. Sound image points q of a predetermined number (i.e., one or more) unit segments Tu are placed in the localization image 142. Note that details of mathematical expression (2) above are disclosed, for example, in "Demixing Commercial Music Productions via Human-Assisted Time-Frequency Masking" by M. Vinyes, J. Bonada and A. Loscos in Audio Engineering Society 120th Convention, France, 2006.

$$\xi = \arctan\left(\frac{|XL(f,t)|}{|XR(f,t)|}\right)\cdot\frac{2}{\pi} \tag{2}$$

By operating the input device 12 appropriately, the user can designate a desired area 148 of the localization image 142 (such a designated area will hereinafter referred to as "selected area"). The display control section 39 causes the display device 14 to display the user-designated selected area 148. A position and dimensions of individual sides of the selected area 148 are variably set in accordance with instructions given by the user. Sound image points q corresponding to individual ones of a plurality of audio components (i.e., individual sound sources at the time of recording) constituting the audio signal x are unevenly located in regions corresponding to respective localized positions and frequency characteristics of that audio component. The user designates a selected area 148 such that a sound image point q corresponding to a user-desired target component is included within the selected area 148, while visually checking a distribution of the sound image points q within the localization image 142. In a preferred implementation, a frequency band for each of a plurality of types of audio components that may appear in the audio signal x may be registered in advance so that the frequency band registered for a user-selected type of audio component is automatically set as a distribution range, on the frequency axis, of the selected area 148.

A set of frequencies (frequency bands) f corresponding to the individual sound image points q within the user-designated selected area 148 (i.e., sound image point distribution range, on the frequency axis 146, of the selected area 148) as shown in FIG. 2 will hereinafter be referred to as "particular frequency band range B0", and a range, on the localization axis 144, where the individual sound image points q within the user-designated selected area 148 are distributed (i.e., distribution range, on the localization axis 144, of the selected area 148) as shown in FIG. 2 will hereinafter be referred to as "selected localization area C0". Namely, localization components within the particular frequency band range B0 whose sound images are localized in the selected localization area C0 is roughly designated as objects of suppression of the audio signal x.

The coefficient train generation section 33 of FIG. 1 includes a basic coefficient train generation section 42 and a coefficient train processing section 44A. The basic coefficient train generation section 42 generates, for each of the unit segments Tu, a basic coefficient train H(t) that provides initial values (bases) of the processing coefficient train G(t). The basic coefficient train H(t) is a plurality of series of f basic coefficient values h(f,t) corresponding to different frequencies f.

The basic coefficient train generation section 42 generates the basic coefficient train H(t) such that individual frequency components existing within the selected area 148 (i.e., components localized in the selected localization area C0 among the frequencies f within the particular frequency band range B0) as a result of the basic coefficient train H(t) being caused to act on the frequency spectra $X_L$ and $X_R$ are suppressed relative to the other frequency components. More specifically, the basic coefficient train generation section 42 sets, at the suppression value γ0 (i.e., value that suppresses audio components), each of coefficient values h(f,t) of the basic coefficient train H(t) which correspond to individual frequencies f of frequency components within the selected area 148, and sets the other coefficient values h(f,t) at the pass value γ1 (i.e., value that causes passage of audio components with their intensity maintained).

Audio components other than the target component can coexist with the target component within the user-designated selected area 148 (i.e., components within the particular frequency band range B0 localized in the selected localization area C0). Thus, if the basic coefficient train H(t) is applied to the audio signal x as the processing coefficient train (processing coefficient train) G(t), then the audio components other than the target component would be suppressed together with the target component. More specifically, of the audio components within the particular frequency band range B0 which are localized in a direction of the selected localization area C0 (positions ξ) (i.e., audio components within the particular frequency band range B0 whose sound images are localized in the same direction as the target component), even the other audio components than the target component can be suppressed together with the target component. Therefore, the coefficient train processing section 44A changes the individual coefficient values h(f,t) of the basic coefficient train H(t) in such a manner that, of the frequency components within the selected area 148, the other frequency components than the target component can be caused to pass through the component suppression process (i.e., can be maintained even in the audio signal y), to thereby generate the processing coefficient train G(t). Namely, for the basic coefficient train H(t) generated by the basic coefficient train generation section 42, the coefficient train processing section 44A changes, to the pass value γ1 (i.e., value causing passage of audio components), coefficient values h(f,t) corresponding to the frequencies f of the individual frequency components of the other audio components than the target component among the plurality of coefficient values h(f,t) corresponding to the individual frequency components within the selected area 148. By such change to the pass value γ1, the coefficient train processing section 44A generates the processing coefficient train G(t).

Figure 3:
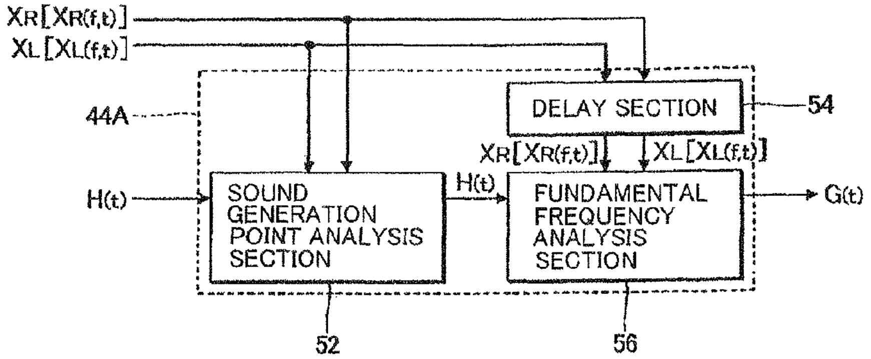
FIG. 3 is a block diagram showing details of a coefficient train processing section in the first embodiment.

FIG. 3 is a block diagram showing details of the coefficient train processing section 44A. As shown in FIG. 3, the coefficient train processing section 44A includes a sound generation point analysis section 52, a delay section 54 and a fundamental frequency analysis section 56, details of which will be discussed hereinbelow.

<Sound Generation Point Analysis Section 52>

Figure 4:
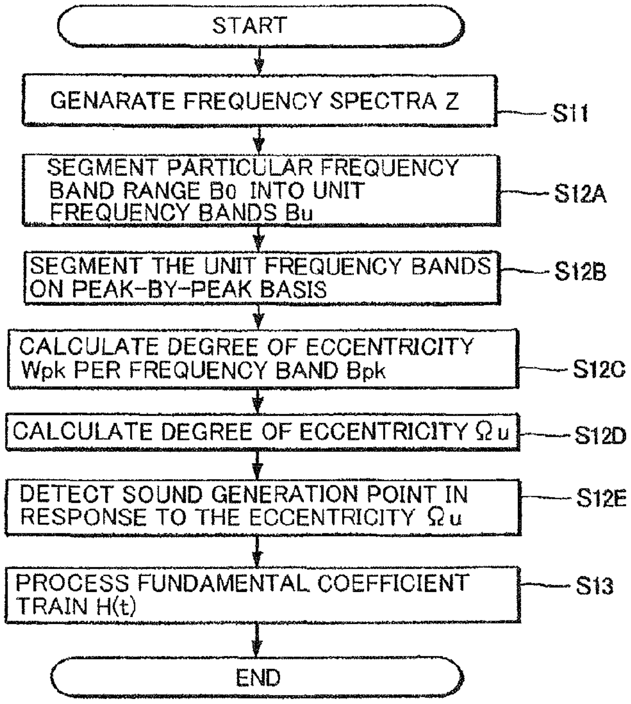
FIG. 4 is a flow chart showing an example operational sequence of a process performed by a sound generation point analysis section in the first embodiment.

The sound generation point analysis section 52 processes the basic coefficient train H(t) in such a manner that, of the audio signal x, a portion (i.e., an attack portion where a sound volume rises) immediately following a sound generation point of each of the audio components within the selected area 148 are caused to pass through the component suppression process. FIG. 4 is a flow chart explanatory of an example operational sequence of a process performed by the sound generation point analysis section 52 for each of the unit segments Tu. Upon start of the process of FIG. 4, the sound generation point analysis section 52 generates, for each of the unit segments Tu on the time axis, frequency spectra (complex spectra) Z by adding together or averaging the frequency spectra $X_L$ of the audio signal $x_L$ and the frequency spectra $X_R$ of the audio signal $x_R$ for the unit segment Tu, at step S11. Note that, of synthesized frequency spectra that are added or averaged results between the audio signal $x_L$ and the audio signal $x_R$, a plurality of frequency components corresponding to the individual sound image points q included within the selected area 148 may be selected and arranged on the frequency axis, and series of the thus-arranged frequency components may be used as frequency spectra Z; namely, there may be generated frequency spectra Z that comprise only the plurality of frequency components included within the selected area 148. The sound generation point analysis section 52 detects the sound generation points of the individual audio components by analyzing the frequency components Z(f,t) of the frequency spectra Z included within the particular frequency band range B0, at steps S12A to S12E. Although the sound generation point detection may be performed by use of any desired conventionally-known technique, method or scheme, a scheme exemplified below is particularly suitable for the sound generation point detection.

Figure 5:
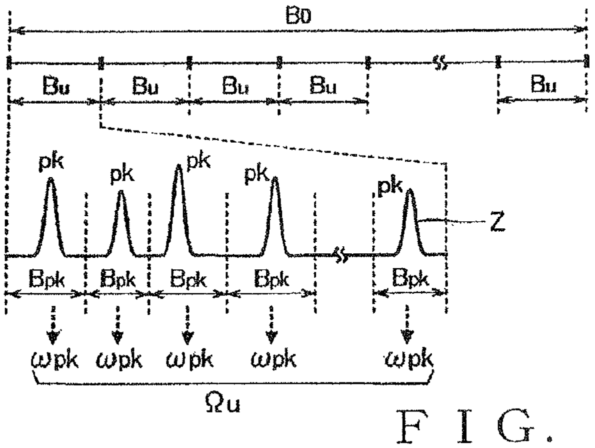
FIG. 5 is a diagram explanatory of an operation performed by the sound generation point analysis section for calculating a degree of eccentricity.

As shown in FIG. 5, the sound generation point analysis section 52 divides or segments the particular frequency band range B0 into a plurality unit frequency bands Bu, at step S12A. Further, the sound generation point analysis section 52 detects a plurality of peaks pk present within the particular frequency band range B0 from the frequency spectra Z generated at step S11 above and then segments the individual unit frequency bands Bu into a plurality of frequency bands Bpk on a peak (Bpk)-by-peak basis, at step S12B. The peaks pk may be detected by use of any desired conventionally-known scheme. Then, the sound generation point analysis section 52 calculates, for each of the frequency bands Bpk, a degree of eccentricity ωpk expressed by mathematical expression (3) below, at step S12C. "|Z(f,t)|" in mathematical expression (3) represents an amplitude of a frequency component Z(f,t) of a frequency f of the frequency spectra Z, and "φ(f,t)" represents a phase angle of the frequency component Z(f,t) of the frequency spectra Z.

$$\omega_{pk} = \frac{\int_{B_{pk}} -\frac{\partial \phi(f,t)}{\partial f} |Z(f,t)|^2 \, df}{\int_{B_{pk}} |Z(f,t)|^2 \, df} \quad (3)$$

Further, at step S12D, the sound generation point analysis section 52 calculates a degree of eccentricity Ωu by averaging the eccentricities, calculated for the individual frequency bands Bpk at step S12C, over the plurality of frequency bands Bpk. Namely, the degree of eccentricity Ωu is calculated per unit frequency band Bu within the particular frequency band range B0 for each of the unit segments Tu.

Figure 6:
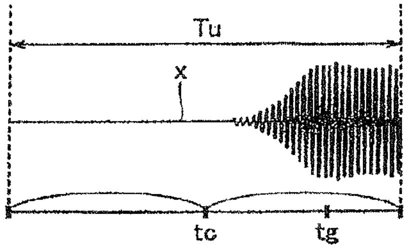
FIG. 6 is a diagram explanatory of the degree of eccentricity.

A partial differential of the phase angle ϕ(f,t) in mathematical expression (3) above represents a group delay. Namely, mathematical expression (3) corresponds to a weighted sum of group delays calculated with the power "$|Z(f,t)|^2$" of the frequency spectra Z as a weighting. Thus, as shown in FIG. 6, the degree of eccentricity Ωu can be used as an index of a difference (eccentricity) between a middle point tc, on the time axis, of the unit segment Tu defined by the window function and a center of gravity tg, on the time axis, of energy within the unit frequency band Bu of the audio signal x in the unit segment Tu.

Figure 7:
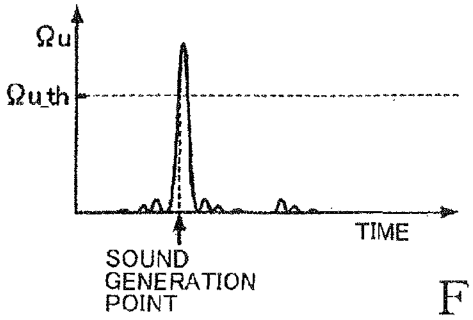
FIG. 7 is a diagram explanatory of relationship between variation over time in the degree of eccentricity and a sound generation point.

In a steady state before arrival of the sound generation point of an audio component or after passage of the sound generation point (i.e., state where energy of the audio component is in a stable condition), the above-mentioned middle point tc and the above-mentioned center of gravity tg generally coincide with each other on the time axis. At the sound generation point of an audio component, on the other hand, the center of gravity tg is located off, i.e. behind, the middle point tc. Thus, the degree of eccentricity Ωu of a particular unit frequency band Bu instantaneously increases in the neighborhood of a sound generation point of the audio component within the unit frequency band Bu, as shown in FIG. 7. In view of the aforementioned tendencies, the sound generation point analysis section 52 in the instant embodiment detects a sound generation point of the audio component for each of the unit frequency bands Bu in response to variation over time of the degree of eccentricity Ωu in the unit frequency band Bu, at step S12E. Namely, the sound generation point analysis section 52 detects a unit segment Tu where the degree of eccentricity Ωu of any one of the unit frequency bands Bu exceeds a predetermined threshold value Ωu_th, as a sound generation point of the audio component of the unit frequency band Bu, as shown in FIG. 7. The threshold value Ωu_th is set at a same value for all of the unit frequency bands Bu within the particular frequency band range B0. Alternatively, the threshold value Ωu_th may be differentiated from one unit frequency band Bu to another in accordance with heights of the frequencies f in the unit frequency bands Bu.

Figure 8:
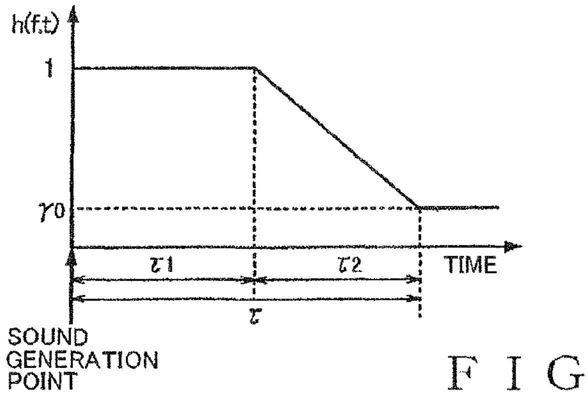
FIG. 8 is a graph showing variation in coefficient value immediately following the sound generation point.

Once a sound generation point of an audio component within the particular frequency band range B0 is detected at steps S12A to S12E, the sound generation point analysis section 52 sets individual coefficient values h(f,t) of the basic coefficient train H(t) in such a manner that the audio component passes through the component suppression process over a predetermined time period τ from the sound generation point, at step S13. Namely, as seen in FIG. 8, the sound generation point analysis section 52 sets the coefficient values h(f,t) of the basic coefficient train H(t) for the unit frequency band Bu, where the sound generation point has been detected at step S12E, at the pass value γ1, greater than the suppression value γ0, over the time period τ (τ=τ1+τ2) from the sound generation point. More specifically, as seen in FIG. 8, the pass value γ1 is set at "1" in each of the unit segments Tu within the time period τ1 that starts at the sound generation point, and then progressively decreases in the individual unit segments Tu within the time period τ2, preceding the time period τ1, to ultimately reach the suppression value γ0. Thus, of audio components within the particular frequency band range B0 which have been set as objects of suppression in the basic coefficient train H(t) generated by the sound generation point analysis section 52, a particular audio component, such as a percussion instrument sound, having a distinguished or prominent sound generation point is caused to pass through the component suppression process. Time lengths of the time periods τ1 and τ2 are selected appropriately in accordance with a duration of an audio component (typically, percussion instrument sound) within the particular frequency band range B0 which should be caused to pass through the component suppression process. The foregoing has been a description about the behavior of the sound generation point analysis section 52.

As a result of the processing, by the sound generation point analysis section 52, of the basic coefficient train H(t), a segment immediately following a sound generation point of each audio component (such as a singing sound as a target component), other than a percussion instrument sound, within the particular frequency band range B0 will be caused to pass through the component suppression process. However, because each audio component other than the percussion instrument sound presents a slow sound volume rise at the sound generation point as compared to the percussion instrument sound, the audio component other than the percussion instrument sound will not excessively become prominent in the processing by the sound generation point analysis section 52.

The delay section 54 of FIG. 3 delays the frequency spectra $X_L$ and $X_R$, generated by the frequency analysis section 31, by a time necessary for the operations (at steps S11 to S13 of FIG. 4) to be performed by the sound generation point analysis section 52, and supplies the delayed frequency spectra $X_L$ and $X_R$ to the fundamental frequency analysis section 56. In this way, the frequency spectra $X_L$ and $X_R$ of each of the unit segments Tu and the basic coefficient train H(t) generated by the sound generation point analysis section 52 for that unit segment Tu are supplied in parallel (concurrently) to the fundamental frequency analysis section 56.

<Fundamental Frequency Analysis Section 56>

Figure 9:
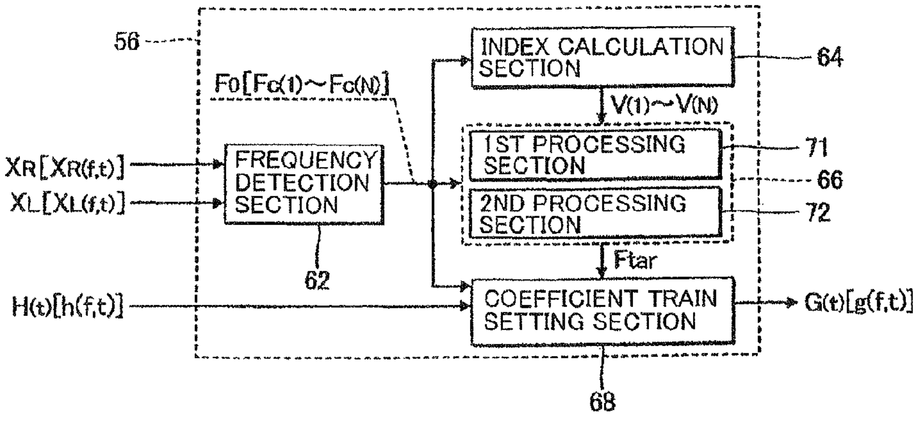
FIG. 9 is a block diagram showing details of a fundamental frequency analysis section in the first embodiment.

The fundamental frequency analysis section 56 generates a processing coefficient train G(t) by processing the basic coefficient train, having been processed by the sound generation point analysis section 52, in such a manner that, of the audio components within the particular frequency band range B0, audio components other than target component and having a harmonic structure are caused to pass through the component suppression process. Schematically speaking, the fundamental frequency analysis section 56 not only detects, for each of the unit segments Tu, a plurality M of fundamental frequencies (tone pitches) F0 from among a plurality of frequency components included within the selected area 148 (particular frequency band range B0), but also identifies, as a target frequency Ftar (tar means "target"), any of the detected fundamental frequencies F0 which is highly likely to correspond to the target component (i.e., which has a high likelihood of corresponding to the target component). Then, the fundamental frequency analysis section 56 generates a processing coefficient train G(t) such that not only audio components corresponding to individual fundamental frequencies F0 other than the target frequency Ftar among the M fundamental frequencies F0 but also harmonics frequencies of the other fundamental frequencies F0 pass through the component suppression process. As shown in FIG. 9, the fundamental frequency analysis section 56 includes a frequency detection section 62, an index calculation section 64, a transition analysis section 66 and a coefficient train setting section 68. The following describe in detail the individual components of the fundamental frequency analysis section 56.

<Frequency Detection Section 62>

Figure 10:
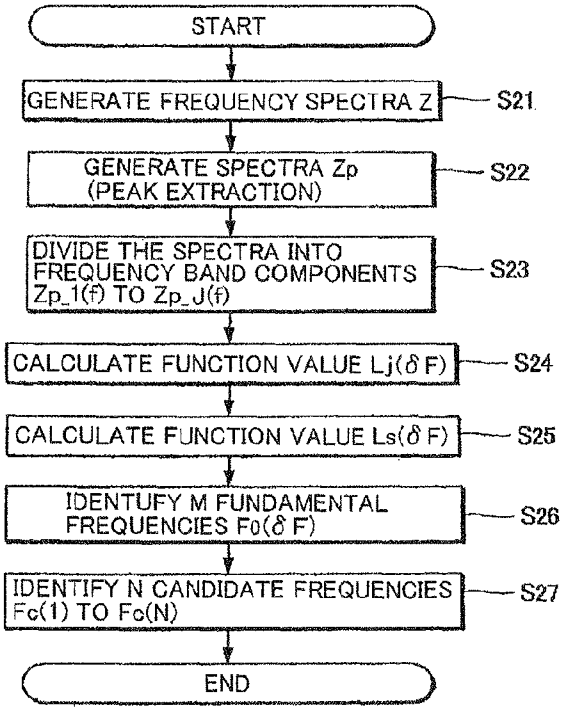
FIG. 10 is a flow chart showing an example operational sequence of a process performed by a frequency detection section in the first embodiment.

The frequency detection section 62 detects M fundamental frequencies F0 corresponding to a plurality of frequency components within the selected area 148. Whereas such detection, by the frequency detection section 62, of the fundamental frequencies F0 may be made by use of any desired conventionally-known technique, a scheme or process illustratively described below with referent to FIG. 10 is particularly preferable among others. The process of FIG. 10 is performed sequentially for each of the unit segments Tu. Details of such a process are disclosed in "Multiple fundamental frequency estimation based on harmonicity and spectral smoothness" by A. P. Klapuri, IEEE Trans. Speech and Audio Proc., 11(6), 804-816, 2003.

Upon start of the process of FIG. 10, the frequency detection section 62 generates, at step S21, frequency spectra Z by adding together or averaging the frequency spectra $X_L$ and frequency spectra $X_R$, delayed by the delay section 54, in a similar manner to the operation at step S11 of FIG. 4. For example, of synthesized frequency spectra that are added or averaged results between the frequency spectra XL and the frequency spectra $X_R$, individual frequency components included within the selected area 148 (particular frequency band range B0) may be selected and arranged on the frequency axis, and series of the thus-arranged frequency components may be generated as frequency spectra Z. Then, the frequency detection section 62 generates frequency spectra Zp with peaks pk of the frequency spectra Z within the particular frequency band range B0 emphasized, at step S22. More specifically, the frequency detection section 62 calculates frequency components Zp(f) of individual frequencies f of the frequency spectra Zp through computing of mathematical expression (4A) to mathematical expression (4C) below.

$$Zp(f) = \max\{0, \zeta(f) - N(f)\} \tag{4A}$$

$$\zeta(f) = \ln\left\{1 + \frac{1}{\eta}Z(f)\right\} \tag{4B}$$

$$\eta = \left[\frac{1}{k_1 - k_0 + 1}\sum_{l=k_0}^{k_1} Z(l)^{1/3}\right]^3 \tag{4C}$$

Constants k0 and k1 in mathematical expression (4C) are set at respective predetermined values (for example, k0=50 Hz, and k1=6 kHz). Mathematical expression (4B) is intended to emphasize a peak in the frequency spectra Z. Further, "Nf" in mathematical expression (4A) represents a moving average, on the frequency axis, of a frequency component Z(f) of the frequency spectra Z. Thus, as seen from mathematical expression (4A), frequency spectra Zp are generated in which a frequency component Zp(f) corresponding to a peak in the frequency spectra Z takes a maximum value and a frequency component Zp(f) between adjoining peaks takes a value "0".

The frequency detection section 62 divides the frequency spectra Z into a plurality J of frequency band components Zp_1(*f*) to Zp_J(f), at step S23. The j-th (j=1−J) frequency band component Zp_J(f), as expressed in mathematical expression (5) below, is a component obtained by multiplying the frequency spectra Zp (frequency component Zp(f)), generated at step S22, by a window function Wj(f).

$$Zp\_j(f) = Wj(f) \cdot Zp(f) \tag{5}$$

Figure 11:
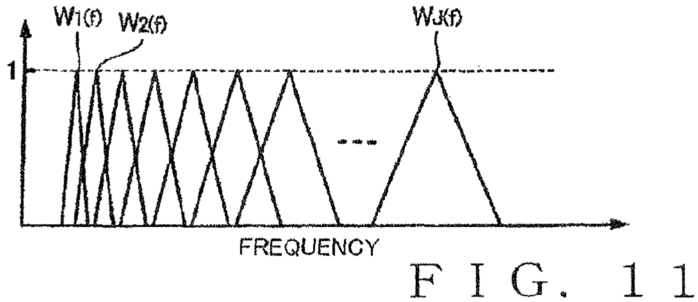
FIG. 11 is a schematic diagram showing window functions for generating frequency band components.
Figure 12:
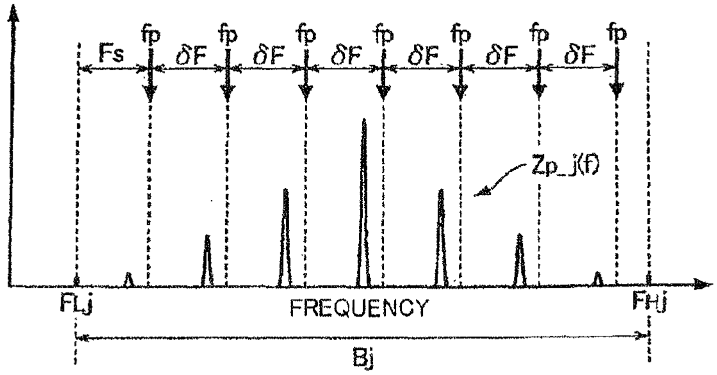
FIG. 12 is a diagram explanatory of behavior of the frequency detection section.

"Wj(f)" in mathematical expression (5) represents the window function set on the frequency axis. In view of human auditory characteristics (Mel scale), the window functions W1(*f*) to WJ(f) are set such that window resolution decreases as the frequency increases as shown in FIG. 11. FIG. 12 shows the j-th frequency band component Zp_j(f) generated at step S23.

For each of the J frequency band components Zp_1(*f*) to Zp_J(f) calculated at step S23, the frequency detection section 62 calculates a function value Lj(δF) represented by mathematical expression (6) below, at step S24.

$$Lj(\delta F) = \max\{A(Fs, \delta F)\} \tag{6}$$

$$\begin{aligned} A(Fs, \delta F) &= c(Fs, \delta F) \cdot a(Fs, \delta F) \\ &= c(Fs, \delta F) \cdot \sum_{i=0}^{I(Fs,\delta F)-1} Zp\_j(FLj + Fs + i\delta F) \end{aligned}$$

$$I(Fs, \delta F) = \left\lfloor \frac{FHj - Fs}{\delta F} \right\rfloor$$

$$c(Fs, \delta F) = \left[\frac{0.75}{I(Fs, \delta F)}\right] + 0.25$$

As shown in FIG. 12, the frequency band components Zp_j(f) are distributed within a frequency band range Bj from a frequency $F_{Lj}$ to a frequency $F_{Hj}$. Within the frequency band range Bj, object frequencies fp are set at intervals (with periods) of a frequency δF, starting at a frequency ($F_{Lj}$+Fs) higher than the lower-end frequency $F_{Lj}$ by an offset frequency Fs. The frequency Fs and the frequency δF are variable in value. "I(Fs, δF)" in mathematical expression (6) above represents a total number of the object frequencies fp within the frequency band range Bj. As understood from the foregoing, a function value a(Fs, δF) corresponds to a sum of the frequency band components Zp_j(f) at individual ones of the number I(Fs, δF) of the object frequencies fp (i.e., sum of the number I(Fs, δF) of values). Further, a variable "c(Fs, δF)" is an element for normalizing the function value a(Fs, δF).

Figure 13:
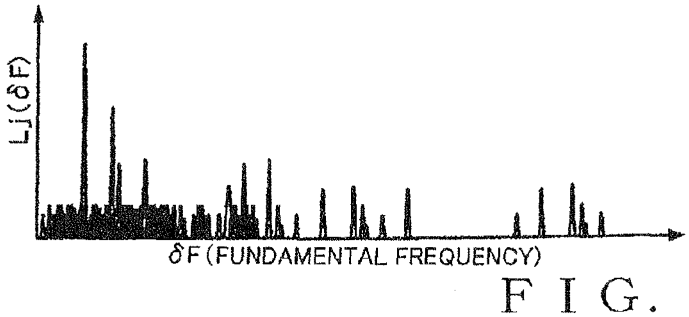
FIG. 13 is a diagram explanatory of an operation performed by the frequency detection section for detecting a fundamental frequency.

"max{A(Fs, δF)}" in mathematical expression (6) represents a maximum value of a plurality of the function values A(Fs, δF) calculated for different frequencies Fs. FIG. 13 is a graph showing relationship between a function value Lj(δF) calculated by execution of mathematical expression (6) and frequency δF of each of the object frequencies fp. As shown in FIG. 13, a plurality of peaks exist in the function value Lj(δF). As understood from mathematical expression (6), the function value Lj(δF) takes a greater value as the individual object frequencies fp, arranged at the intervals of the frequency δF, become closer to the frequencies of the individual peaks (namely, harmonics frequencies) of the frequency band component Zp_j(f). Namely, it is very likely that a given frequency δF at which the function value Lj(δF) takes a peak value corresponds to the fundamental frequency F0 of the frequency band component Zp_j(f). In other words, if the function value Lj(δF) calculated for a given frequency δF takes a peak value, then the given frequency δF is very likely to correspond to the fundamental frequency F0 of the frequency band component Zp_j(f).

The frequency detection section 62 calculates, at step S25, a function value Ls(δF) (Ls(δF)=L1(δF)+L2(δF)+

L3(δF)+ . . . +LJ(δF)) by adding together or averaging the function values Lj(δF), calculated at step S24 for the individual frequency band components Zp_j(f), over the J frequency band components Zp_1(1) to Zp_J(f). As understood from the foregoing, the function value Ls(δF) takes a greater value as the frequency δF is closer to any one of the fundamental frequencies F0 of the frequency components (frequency spectra Z) within the selected area 148 (i.e., within the particular frequency band range B0). Namely, the function value Ls(δF) indicates a degree of likelihood (probability) with which a frequency δF corresponds to the fundamental frequency F0 of any one of the audio components within the selected area 148, and a distribution of the function values Ls(δF) corresponds to a probability density function of the fundamental frequency F0 with the frequency δF used as a random variable.

Further, the frequency detection section 62 selects, from among a plurality of peaks of the degree of likelihood Ls(δF) calculated at step S25, M peaks in descending order of values of the degrees of likelihood Ls(δF) at the individual peaks (i.e., M peaks starting with the peak of the greatest degree of likelihood Ls(δF)), and identifies M fundamental frequencies δF, corresponding to the individual peaks, as the fundamental frequencies F0 of the individual audio components within the selected area 148 (i.e., within the particular frequency band range B0), at step S26. Each of the M fundamental frequencies F0 is the fundamental frequency of any one of the audio components (including the target component) having a harmonics structure within the selected area 148 (i.e., within the particular frequency band range B0). Note that the scheme for identifying the M fundamental frequencies F0 is not limited to the aforementioned. The instant embodiment may employ an alternative scheme, which identifies a single fundamental frequency F0 by repeatedly performing a process in which one peak of the greatest degree of likelihood Ls(δF) is identified as the fundamental frequency F0 and then a degree of likelihood Ls(δF) is re-calculated after frequency components corresponding to the fundamental frequency F0 and individual harmonics frequencies of the fundamental frequency F0 are removed from the frequency spectra Z. With such an alternative scheme, the instant embodiment can advantageously reduce a possibility that harmonics frequencies of individual audio components are erroneously detected as fundamental frequencies F0.

Furthermore, the frequency detection section 62 selects, from among the M fundamental frequencies F0 identified at step S26, a plurality N of fundamental frequencies F0 in descending order of the values or degrees of likelihood Ls(δF) (i.e., N fundamental frequencies F0 starting with the fundamental frequency of the greatest degree of likelihood Ls(δF)) as candidates of the fundamental frequency of the target component (hereinafter also referred to simply as "candidate frequencies") Fc1 to Fc(N), at step S27. The reason why fundamental frequencies F0 having great degrees of likelihood Ls(δF) of the M fundamental frequencies F0 are selected as candidate frequencies Fc1 to Fc(N) of the target component (singing sound) is that the target component, which is a relatively prominent audio component (i.e., audio component having a relatively great sound volume) in the audio signal x has a tendency of having a great value of the degree of likelihood Ls(δF) as compared to other audio components than the target component. By the aforementioned process (steps S21 to S27) of FIG. 10 being performed sequentially for each of the unit segments Tu, M fundamental frequencies F0 and N candidate frequencies Fc1 to Fc(N) of the M fundamental frequencies F0 are identified for each of the unit segments Tu.

<Index Calculation Section 64>

The index calculation section 64 of FIG. 9 calculates, for each of the N candidate frequencies Fc1 to Fc(N) identified by the frequency detection section 62 at step S27, a characteristic index value V(n) indicative of similarity and/or dissimilarity between a character amount (typically, timbre or tone color character amount) of a harmonics structure corresponding to the candidate frequency Fc(n) (n=1–N) and a character amount assumed for the target component. Namely, the characteristic index value V(n) represents an index (tone color) that evaluates, from the perspective of an acoustic characteristic, a degree of likelihood of the candidate frequency Fc(n) corresponding to the target component (i.e., degree of likelihood of being a voice in the instant embodiment where the target component is a singing sound) an assumed character amount of the target amount. In the following description, let it be assumed that an MFCC (Mel Frequency Cepstral Coefficient) is the character amount of the harmonics structure, although any other suitable character amount than such an MFCC may be used.

Figure 14:
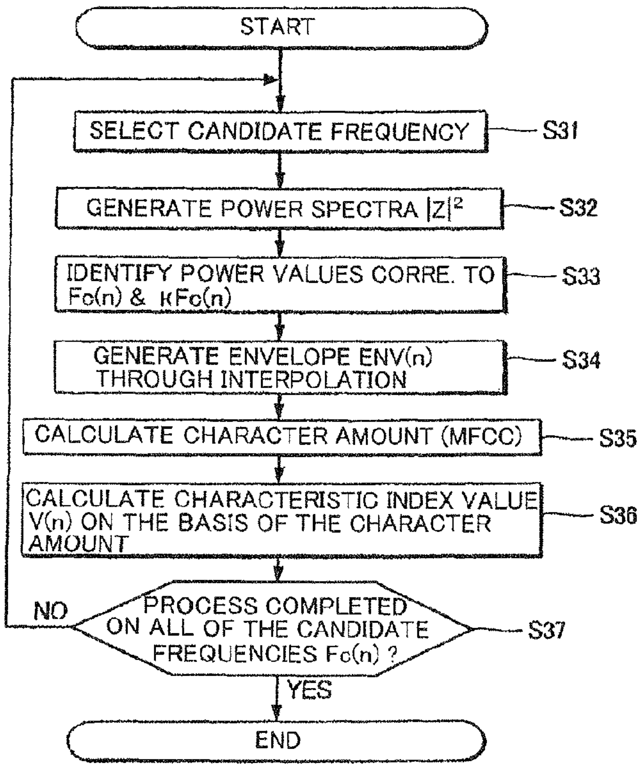
FIG. 14 is a flow chart explanatory of an example operational sequence of a process performed by an index calculation section in the first embodiment.

FIG. 14 is a flow chart explanatory of an example operational sequence of a process performed by the index calculation section 64. A plurality N of characteristic index values V(1) to V(N) are calculated by the process of FIG. 14 being performed sequentially for each of the unit segments Tu. Upon start of the process of FIG. 14, the index calculation section 64 selects one candidate frequency Fc(n) from among the N candidate frequencies Fc1 to Fc(N), at step S31. Then, at steps S32 to S35, the index calculation section 64 calculates a character amount of a harmonics structure (envelope) with the candidate frequency Fc(n), selected at step S31, as the fundamental frequency F0.

More specifically, the index calculation section 64 generates, at step S32, power spectra $|Z|^2$ from the frequency spectra Z generated at step S21, and then identifies, at step S33, power values of the power spectra $|Z|^2$ which correspond to the candidate frequency Fc(n) selected at step S31 and harmonics frequencies κFc(n) (κ=2, 3, 4, . . . ) of the candidate frequency Fc(n). For example, the index calculation section 64 multiplies the power spectra $|Z|^2$ by individual window functions (e.g., triangular window functions) where the candidate frequency Fc(n) and the individual harmonics frequencies κFc(n) are set on the frequency axis as center frequencies, and identifies maximum products (black dots in FIG. 15), obtained for the individual window functions, as power values corresponding to the candidate frequency Fc(n) and individual harmonics frequencies κFc(n).

Figure 15:
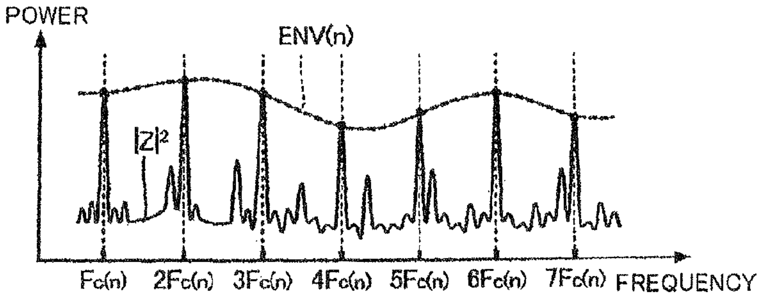
FIG. 15 is a diagram showing an operation performed by the index calculation section for extracting a character amount (MFCC)

The index calculation section 64 generates, at step S34, an envelope ENV(n) by interpolating between the power values calculated at step S33 for the candidate frequency Fc(n) and individual harmonics frequencies κFc(n), as shown in FIG. 15. More specifically, the envelope ENV(n) is calculated by performing interpolation between logarithmic values (dB values) converted from the power values and then reconverting the interpolated logarithmic values (dB values) back to power values. Any desired conventionally-known interpolation technique, such as the Lagrange interpolation, may be employed for the interpolation at step S34. As understood from the foregoing, the envelope ENV(n) corresponds to an envelope of frequency spectra of an audio component (harmonic sound) of the audio signal x which has the candidate frequency Fc(n) as the fundamental frequency F0. Then, at step S35, the index calculation section 64 calculates an MFCC (character amount) from the envelope ENV(n) generated at step S34. Any desired scheme may be employed for the calculation of the MFCC.

The index calculation section 64 calculates, at step S36, a characteristic index value V(n) (i.e., degree of likelihood of corresponding to the target component) on the basis of the MFCC calculated at step S35. Whereas any desired conventionally-known technique may be employed for the calculation of the characteristic index value V(n), the SVM (Support Vector Machine) is preferable among others. Namely, the index calculation section 64 learns in advance a separating plane (boundary) for classifying learning samples, where a voice (singing sound) and non-voice sounds (e.g., performance sounds of musical instruments) exist in a mixed fashion, into a plurality of clusters, and sets, for each of the clusters, a probability (e.g., an intermediate value equal to or greater than "0" and equal to or smaller than "1") with which samples within the cluster corresponds to the voice. At the time of calculating the characteristic index value V(n), the index calculation section 64 determines, by application of the separating plane, a cluster which the MFCC calculated at step S35 should belong to, and identifies, as the characteristic index value V(n), the probability set for the cluster. For example, the higher the possibility (likelihood) with which an audio component corresponding to the candidate frequency V(n) corresponds to the target component (i.e., singing sound), the closer to "1" the characteristic index value V(n) is set at, and, the higher the possibility with which the audio component does not correspond to the target component (singing sound), the closer to "0" the characteristic index value V(n) is set at.

Then, at step S37, the index calculation section 64 makes a determination as to whether the aforementioned operations of steps S31 to S36 have been performed on all of the N candidate frequencies Fc1 to Fc(N) (i.e., whether the process of FIG. 14 has been completed on all of the N candidate frequencies). With a negative (NO) determination at step S37, the index calculation section 64 newly selects, at step S31, an unprocessed (not-yet-processed) candidate frequency Fc(n) and performs the operations of steps S32 to S37 on the selected unprocessed candidate frequency Fc(n). Once the aforementioned operations of steps S31 to S36 have been performed on all of the N candidate frequencies Fc1 to Fc(N) (YES determination at step S37), the index calculation section 64 terminates the process of FIG. 14. In this manner, N characteristic index values V(1) to V(N) corresponding to different candidate frequencies Fc(n) are calculated sequentially for each of the unit segments Tu.

<Transition Analysis Section 66>

The transition analysis section 66 of FIG. 9 selects, from among the N candidate frequencies Fc1 to Fc(N) calculated by the frequency detection section 62 for each of the unit segments Tu, a target frequency Ftar having a high degree of likelihood of corresponding to the fundamental frequency of the target component. Namely, a time series (trajectory) of target frequencies Ftar is identified. As shown in FIG. 9, the transition analysis section 66 includes a first processing section 71 and a second processing section 72, respective functions of which will be detailed hereinbelow.

<First Processing Section 71>

Figure 16:
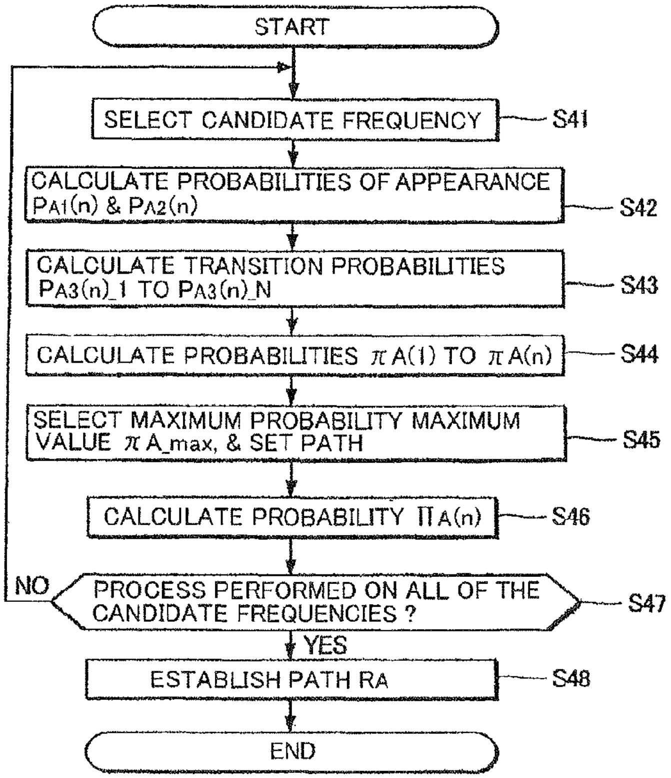
FIG. 16 is a flow chart explanatory of an example operational sequence of a process performed by a first processing section in the first embodiment.

The first processing section 71 identifies, from among the N candidate frequencies Fc1 to Fc(N), a candidate frequency Fc(n) having a high degree of likelihood of corresponding to the target component. FIG. 16 is a flow chart explanatory of an example operational sequence of a process performed by the first processing section 71. The process of FIG. 16 is performed each time the frequency detection section 62 identifies or specifies N candidate frequencies Fc1 to Fc(N) for the latest (newest) unit segment (hereinafter referred to as "new unit segment").

Figure 17:
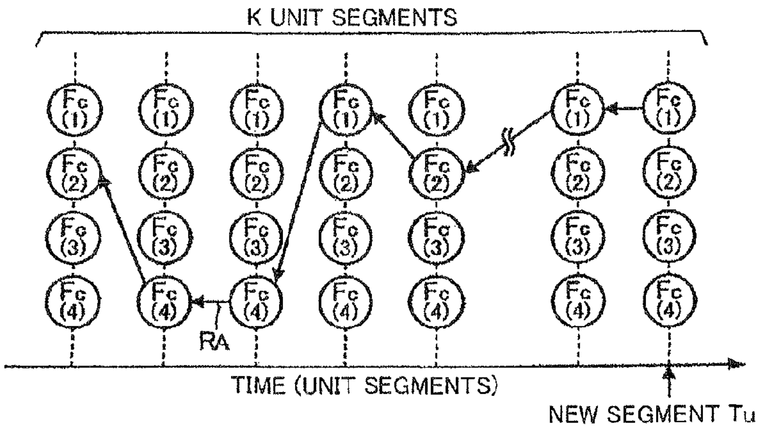
FIG. 17 is a diagram explanatory of an operation performed by the first processing section for selecting a candidate frequency for each unit segment.

Schematically speaking, the process of FIG. 16 is a process for identifying or searching for a path RA extending over a plurality K of unit segments Tu ending with the new unit segment Tu. The path RA represents a time series (transition of candidate frequencies Fc(n)) where candidate frequencies Fc(n) identified as having a high degree of possibility or likelihood of corresponding to the target component among sets of the N candidate frequencies Fc(n) (four candidate frequencies Fc(1) to Fc(4) in the illustrated example of FIG. 17) identified per unit segment Tu are arranged one after another for the K unit segments Tu. Whereas any desired conventionally-known technique may be employed for searching for the path RA, the dynamic programming scheme is preferable among others from the standpoint of reduction in the quantity of necessary arithmetic operations. In the illustrated example of FIG. 16, let it be assumed that the path RA is identified using the Viterbi algorithm that is an example of the dynamic programming scheme. The following detail the process of FIG. 16.

First, the first processing section 71 selects, at step S41, one candidate frequency Fc(n) from among the N candidate frequencies Fc(1) to Fc(4) identified for the new unit segment Tu. Then, the first processing section 71 calculates, at step S42, probabilities of appearance (PA1(*n*) and PA2(*n*)) of the candidate frequency Fc(n) selected at step S41.

The probability PA1(*n*) is variably set in accordance with the degree of likelihood Ls(δF) calculated for the candidate frequency Fc(n) at step S25 of FIG. 10 (Ls(δF)=Ls(Fc(n)). More specifically, the greater the degree of likelihood Ls(Fc(n) of the candidate frequency Fc(n), the greater value the probability PA1(*n*) is set at. The first processing section 71 calculates the probability PA1(*n*) of the candidate frequency Fc(n), for example, by executing mathematical expression (7) below which expresses a normal distribution (average $\mu_A 1$, dispersion $\sigma_A 1^2$) with a variable λ(n), corresponding to the degree of likelihood Ls(Fc(n), used as a random variable.

$$P_{A1}(n) = \exp\left(-\frac{\{\lambda(n) - \mu_{A1}\}^2}{2\sigma_{A1}^2}\right) \tag{7}$$

The variable λ(n) in mathematical expression (7) above is, for example, a value obtained by normalizing the degree of likelihood Ls(δF). Whereas any desired scheme may be employed for normalizing the degree of likelihood Ls(Fc(n)), a value obtained, for example, by dividing the degree of likelihood Ls(Fc(n)) by a maximum value of the degree of likelihood Ls(δF) is particularly preferable as the normalized degree of likelihood λ(n). Values of the average $\mu_A 1$ and dispersion $\sigma_A 1^2$ are selected experimentally or statistically (e.g., $\mu_A 1=1$, and $\sigma_A 1^2=0.4$).

The probability PA2(*n*) calculated at step S42 is variably set in accordance with the characteristic index value V(n) calculated by the index calculation section 64 for the candidate frequency Fc(n). More specifically, the greater the characteristic index value V(n) of the candidate frequency Fc(n) (i.e., the greater the degree of likelihood of the candidate frequency Fc(n) corresponding to the target component), the greater value the probability PA2(*n*) is set at. The first processing section 71 calculates the probability PA2(*n*), for example, by executing mathematical expression (8) below which expresses a normal distribution (average $\mu_A 2$, dispersion $\sigma_A 2^2$) with the characteristic index value V(n) used as a random variable. Values of the average $\mu_A 1$ and dispersion $\sigma_A 1^2$ are selected experimentally or statistically (e.g., $\mu_A 2=1=\sigma_A 2^2=1$).

$$p_{A2}(n) = \exp\left(-\frac{\{V(n)-\mu_{A2}\}^2}{2\sigma_{A2}^2}\right) \quad (8)$$

Figure 18:
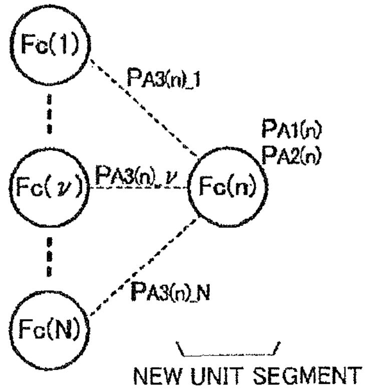
FIG. 18 is a diagram explanatory of probabilities applied to the process performed by the first processing section.

As seen in FIG. 18, the first processing section 71 calculates, at step S43, a plurality N of transition probabilities $P_A3(n)\_1$ to $P_A3(n)\_N$ for each of combinations between the candidate frequency Fc(n), selected for the new unit segment Tu at step S41, and N candidate frequencies Fc(1) to Fc(N) of the unit segment Tu immediately preceding the new unit segment Tu. The probability $P_A3(n)\_\nu$ ($\nu$=1−N) represents a probability with which a transition occurs from a ν-th candidate frequency Fc(ν) of the immediately-preceding unit segment Tu to the candidate frequency Fc(n) of the new unit segment Tu. More specifically, in view of a tendency that a degree of likelihood of a tone pitch of an audio component varying extremely between the unit segments Tu is low, the greater a difference (tone pitch difference) between the immediately-preceding candidate frequency Fc(ν) and the current candidate frequency Fc(n), the smaller value the probability $P_A3(n)\_\nu$ is set at (namely, the probability $P_A3(n)\_\nu$ is set at a smaller value as the difference (tone pitch difference) between the immediately-preceding candidate frequency Fc(ν) and the current candidate frequency Fc(n) increases). The first processing section 71 calculates the N probabilities $P_A3(n)\_1$ to $P_A3(n)\_N$, for example, by executing mathematical expression (9) below.

$$p_{A3}(n)\_\nu = \exp\left(-\frac{[\min\{6, \max(0, |\varepsilon|-0,5)\}-\mu_{A3}]^2}{2\sigma_{A3}^2}\right) \quad (9)$$

Namely, mathematical expression (9) expresses a normal distribution (average $\mu_A3$, dispersion $\sigma_A3^2$) with a function value min[6, max(0, |ε|−0.5)] used as a random variable. "ε" in mathematical expression (9) represents a variable indicative of a difference in semitones between the immediately-preceding candidate frequency Fc(ν) and the current candidate frequency Fc(n). The function value min[6, max(0, |ε|−0.5)] is set at a value obtained by subtracting 0.5 from the above-mentioned difference in semitones ε if the thus-obtained value is smaller than "6" ("0" if the thus-obtained value is a negative value), or set at "6" if the thus-obtained value is greater than "6" (i.e., if the immediately-preceding candidate frequency Fc(ν) and the current candidate frequency Fc(n) differ from each other by more than six semitones). Note that the probabilities $P_A3(n)\_1$ to $P_A3(n)\_N$ of the first unit segment Tu of the audio signal x are set at a predetermined value (e.g., value "1"). Values of the average $\mu_A3$ and dispersion $\sigma_A3^2$ are selected experimentally or statistically (e.g., $\mu_A3=0$, and $=\sigma_A3^2=4$).

Figure 19:
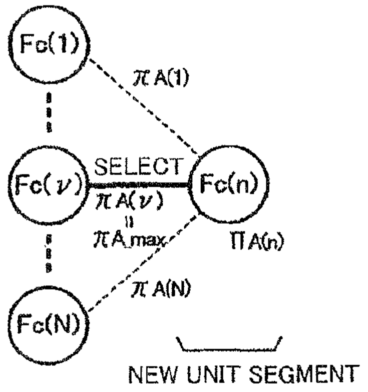
FIG. 19 is a diagram explanatory of probabilities applied to the process performed by the first processing section.

After having calculated the probabilities ($P_A1(n)$, $P_A2(n)$, $P_A3(n)\_1$−$P_A3(n)\_N$) in the aforementioned manner, the first processing section 71 calculates, at step S44, N probabilities $\pi_A(1)$ to $\pi_A(n)$ for each of combinations between the candidate frequency Fc(n) of the new unit segment Tu and the N candidate frequencies Fc(1) to Fc(N) of the unit segment Tu immediately preceding the new unit segment Tu, as shown in FIG. 19. The probability $\pi_A(\nu)$ is in the form of a numerical value corresponding to the probability $P_A1(n)$, probability $P_A2(n)$ and probability $P_A3(n)\_\nu$ of FIG. 18. For example, a sum of respective logarithmic values of the probability $P_A1(n)$, probability $P_A2(n)$ and probability $P_A3(n)\_\nu$ is calculated as the probability $\pi_A(\nu)$. As seen from the foregoing, the probability $\pi_A(\nu)$ represents a probability (degree of likelihood) with which a transition occurs from the ν-th candidate frequency Fc(ν) of the immediately-preceding unit segment Tu to the candidate frequency Fc(n) of the new unit segment Tu.

Then, at step S45, the first processing section 71 selects a maximum value $\pi_A\_max$ of the N probabilities $\pi_A(1)$ to $\pi_A(n)$ calculated at step S44, and sets a path (indicated by a heavy line in FIG. 19) interconnecting the candidate frequency Fc(ν), corresponding to the maximum value $\pi_A\_max$, of the N candidate frequencies Fc(1) to Fc(N) of the immediately-preceding unit segment Tu and the candidate frequency Fc(n) of the new unit segment Tu as shown in FIG. 19. Further, at step S46, the first processing section 71 calculates a probability $\Pi_A(n)$ for the candidate frequency Fc(n) of the new unit segment Tu. The probability $\Pi_A(n)$ is set at a value corresponding to a probability $\Pi_A(\nu)$ previously calculated for the candidate frequency Fc(ν) selected at step S45 from among the N candidate frequencies Fc(1) to Fc(N) of the immediately-preceding unit segment Tu and to the maximum value $\pi_A\_max$ selected at step S45; for example, the probability $\Pi_A(n)$ is set at a sum of respective logarithmic values of the previously-calculated probability $\Pi_A(\nu)$ and maximum value $\pi_A\_max$.

Then, at step S47, the first processing section 71 makes a determination as to whether the aforementioned operations of steps S41 to S46 have been performed on all of the N candidate frequencies Fc1 to Fc(N) of the new unit segment Tu. With a negative (NO) determination at step S47, the first processing section 71 newly selects, at step S41, an unprocessed candidate frequency Fc(n) and then performs the operations of steps S42 to S47 on the selected unprocessed candidate frequency Fc(n). Namely, the operations of steps S41 to S47 are performed on each of the N candidate frequencies Fc1 to Fc(N) of the new unit segment Tu, so that a path from one particular candidate frequency Fc(ν) of the immediately-preceding unit segment Tu (step S45) and a probability $\Pi_A(n)$ (step S46) corresponding to the path are calculated for each of the candidate frequencies Fc(n) of the new unit segment Tu.

Once the aforementioned process has been performed on all of the N candidate frequencies Fc1 to Fc(N) of the new unit segment Tu (YES determination at step S47), the first processing section 71 establishes a path $R_A$ of the candidate frequency Fc(n) extending over the K unit segments Tu ending with the new unit segment Tu, at step S48. The path $R_A$ is a path sequentially tracking backward the individual candidate frequencies Fc(n), interconnected at step S45, over the K unit segments Tu from the candidate frequency Fc(n) of which the probability $\Pi_A(n)$ calculated at step S46 is the greatest among the N candidate frequencies Fc(1) to Fc(N) of the new unit segment Tu. Note that, as long as the number of the unit segments Tu on which the operations of steps S41 to S47 have been completed is less than K (i.e., as long as the operations of steps S41 to S47 have been performed only for each of the unit segments Tu from the start point of the audio signal x to the (K−1)th unit segment), establishment of the path $R_A$ (step S48) is not effected. As set forth above, each time the frequency detection section 62 identifies N candidate frequencies Fc1 to Fc(N) for the new unit segment Tu, the path $R_A$ extending over the K unit segments Tu ending with the new unit segment Tu is identified.

<Second Processing Section 72>

Note that the audio signal x includes some unit segment Tu where the target component does not exist, such a unit segment Tu where a singing sound is at a stop. Because the determination about presence/absence of the target component in the individual unit segments Tu is not made at the time of searching, by the first processing section 71, for the path $R_A$, and thus, in effect, the candidate frequency Fc(n) is identified on the path $R_A$ also for such a unit segment Tu where the target component does not exist. In view of the forgoing circumstance, the second processing section 72 determines presence/absence of the target component in each of the K unit segments Tu corresponding to the individual candidate frequencies Fc(n) on the path $R_A$.

Figure 20:
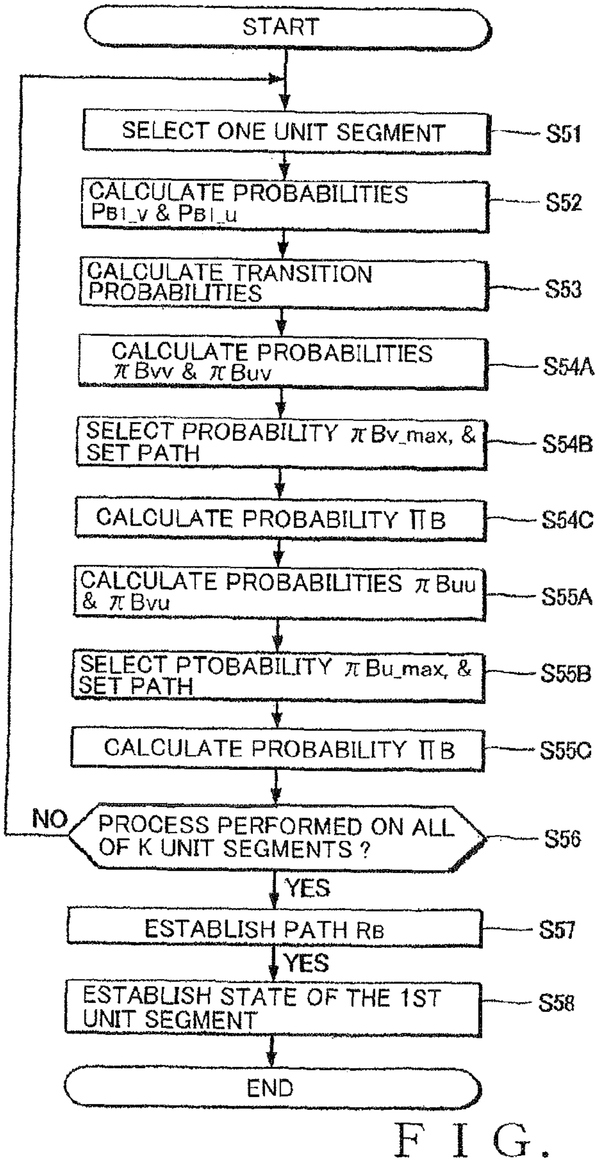
FIG. 20 is a flow chart explanatory of an example operational sequence of a process performed by a second processing section in the first embodiment.
Figure 21:
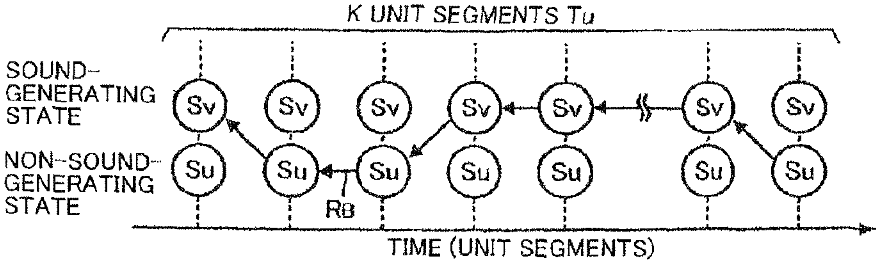
FIG. 21 is a diagram explanatory of an operation performed by the second processing section for determining presence or absence of a target component for each unit segment.

FIG. 20 is a flow chart explanatory of an example operational sequence of a process performed by the second processing section 72. The process of FIG. 20 is performed each time the first processing section 71 identifies a path $R_A$ for each of the unit segments Tu. Schematically speaking, the process of FIG. 20 is a process for identifying a path $R_B$ extending over the K unit segments Tu corresponding to the path $R_A$, as shown in FIG. 21. The path $R_B$ represents a time series (transition of sound-generating and non-sound-generating states), where any one of the sound-generating (or voiced) state Sv and non-sound-generating (unvoiced) state of the target component is selected and the thus-selected sound-generating and non-sound-generating states are arranged sequentially for the K unit segments Tu. The sound-generating state Sv is a state where the candidate frequency Fc(n) of the unit segment Tu in question on the path $R_A$ is sounded as the target component, while the non-sound-generating state Su is a state where the candidate frequency Fc(n) of the unit segment Tu in question on the path $R_A$ is not sounded as the target component. Whereas any desired conventionally-known technique may be employed for searching for the path $R_B$, the dynamic programming scheme is preferred among others from the perspective of reduction in the quantity of necessary arithmetic operations. In the illustrated example of FIG. 20, it is assumed that the path $R_B$ is identified using the Viterbi algorithm that is an example of the dynamic programming scheme. The following detail the process of FIG. 20.

The second processing section 72 selects, at step S51, any one of the K unit segments Tu; the thus-selected unit segment Tu will hereinafter be referred to as "selected unit segment". More specifically, the first unit segment Tu is selected from among the K unit segments Tu at the first execution of step S51, and then, the unit segment Tu immediately following the last-selected unit segment Tu is selected at the second execution of step S51, then the unit segment Tu immediately following the next last-selected unit segment Tu is selected at the third execution of step S51, and so on.

Figure 22:
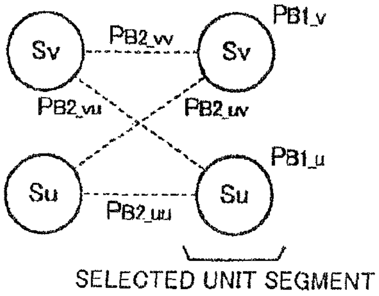
FIG. 22 is a diagram explanatory of probabilities applied to the process performed by the second processing section.

The second processing section 72 calculates, at step S52, probabilities $P_{B1}$_$v$ and $P_{B1}$_$u$ for the selected unit segment Tu, as shown in FIG. 22. The probability $P_{B1}$_$v$ represents a probability with which the target component is in the sound-generating state, while the probability $P_{B1}$_$u$ represents a probability with which the target component is in the non-sound-generating state.

In view of a tendency that the characteristic index value V(n) (degree of likelihood of corresponding to the target component), calculated by the index calculation section 64 for the candidate frequency Fc(n), increases as the degree of likelihood of the candidate frequency Fc(n) of the selected unit segment Tu corresponding to the target component increases, the characteristic index value V(n) is applied to the calculation of the probability $P_{B1}$_$v$ of the sound-generating state. More specifically, the second processing section 72 calculates the probability $P_{B1}$_$v$ by execution of mathematical expression (10) below that expresses a normal distribution (average $\mu_{B1}$, dispersion $\sigma_{B1}^2$) with the characteristic index value V(n) used as a random variable. As understood from mathematical expression (10), the greater the characteristic index value V(n), the greater value the probability $P_{B1}$_$v$ is set at. Values of the average $\mu_{B1}$ and dispersion $\sigma_{B1}^2$ are selected experimentally or statistically (e.g., $\mu_{B1}=\sigma_{B1}^2=1$).

$$P_{B1}\_v = \exp\left(-\frac{\{V(n)-\mu_{B1}\}^2}{2\sigma_{B1}^2}\right) \tag{10}$$

On the other hand, the probability $P_{B1}$_$u$ of the non-sound-generating state Su is a fixed value calculated, for example, by execution of mathematical expression (11) below.

$$P_{B1}\_u = \exp\left(-\frac{\{0.5-\mu_{B1}\}^2}{2\sigma_{B1}^2}\right) \tag{11}$$

Then, the second processing section 72 calculates, at step S53, probabilities ($P_{B2}$_vv, $P_{B2}$_uv, $P_{B2}$_uu and $P_{B2}$_vu) for individual combinations between the sound-generating state Sv and non-sound-generating state Su of the selected unit segment Tu and the sound-generating state Sv and non-sound-generating state Su of the unit segment Tu immediately preceding the selected unit segment Tu, as indicated by broken lines in FIG. 22. As understood from FIG. 22, the probability $P_{B2}$_vv is a probability with which a transition occurs from the sound-generating state Sv of the immediately-preceding unit segment Tu to the sound-generating state Sv of the selected unit segment Tu (namely, vv which means a "voiced→voiced2 transition). Similarly, the probability $P_{B2}$_uv is a probability with which a transition occurs from the non-sound-generating state Su of the immediately-preceding unit segment Tu to the sound-generating state Sv of the selected unit segment Tu (namely, uv: which means an "unvoiced→voiced" transition), the probability $P_{B2}$_uu is a probability with which a transition occurs from the non-sound-generating state Su of the immediately-preceding unit segment Tu to the non-sound-generating state Su of the selected unit segment Tu (namely, uu which means a "unvoiced→unvoiced" transition), and the probability $P_{B2}$_vu is a probability with which a transition occurs from the sound-generating state Sv of the immediately-preceding unit segment Tu to the non-sound-generating state Su of the selected unit segment Tu (namely, vu which means a "voiced→unvoiced"). More specifically, the second processing section 72 calculates the individual probabilities in a manner as represented by mathematical expressions (12A) and (12B) below.

$$P_{B2}\_vv = \exp\left(-\frac{[\min\{6, \max(0, |\varepsilon|-0, 5)\}-\mu_{B2}]^2}{2\sigma_{B2}^2}\right) \tag{12A}$$

$$P_{B2}\_uv = P_{B2}\_uu = P_{B2}\_vu = 1 \tag{12B}$$

Similarly to the probability $P_{A3}(n)$_v calculated with mathematical expression (9) above, the greater an absolute value |ε| of a frequency difference ε in the candidate frequency Fc(n) between the immediately-preceding unit segment Tu and the selected unit segment Tu, the smaller value the probability $P_{B2}$_vv is set at. Values of the average $\mu_{B2}$ and dispersion $\sigma_{B2}^2$ in mathematical expression (12A) above are selected experimentally or statistically (e.g., $\mu_{B2}=0$, and $\sigma_{B2}^2=4$). As understood from mathematical expressions (12A) and (12B) above, the probability $P_{B2}$_vv with which the sound-generating state Sv is maintained in the adjoining unit segments Tu is set lower than the probability PB2_uv or PB2_vu with which a transition occurs from any one of the sound-generating state Sv and non-sound-generating state Su to the other in the adjoining unit segments Tu, or the probability PB2_uu with which the non-sound-generating state Su is maintained in the adjoining unit segments Tu.

Figure 23:
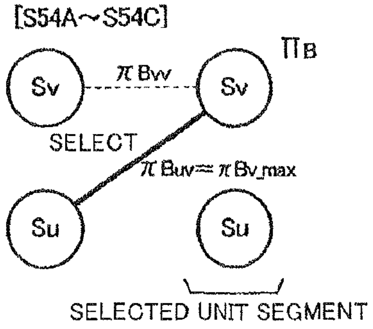
FIG. 23 is a diagram explanatory of probabilities applied to the process performed by the second processing section.

The second processing section 72 selects any one of the sound-generating state Sv and non-sound-generating state Su of the immediately-preceding unit segment Tu in accordance with the individual probabilities (PB1_*v*, PB2_*vv* and PB2_*uv*) pertaining to the sound-generating state Sv of the selected unit segment Tu and then connects the selected sound-generating state Sv or non-sound-generating state Su to the sound-generating state Sv of the selected unit segment Tu, at steps S54A to S54C. More specifically, the second processing section 72 first calculates, at step S54A, probabilities πBvv and πBuv with which transitions occur from the sound-generating state Sv and non-sound-generating state Su of the immediately-preceding unit segment Tu to the sound-generating state Sv of the selected unit segment Tu, as shown in FIG. 23. The probability πBvv is a probability with which a transition occurs from the sound-generating state Sv of the immediately-preceding unit segment Tu to the sound-generating state Sv of the selected unit segment Tu, and this probability πBvv is set at a value corresponding to the probability PB1_*v* calculated at step S52 and probability PB2_*vv* calculated at step S53 (e.g., set at a sum of respective logarithmic values of the probability PB1_*v* and probability PB2_*vv*). Similarly, the probability πBuv is a probability with which a transition occurs from the non-sound-generating state Su of the immediately-preceding unit segment Tu to the sound-generating state Sv of the selected unit segment Tu, and this probability πBuv is calculated in accordance with the probability PB1_*v* and probability PB2_*uv*.

Then, the second processing section 72 selects, at step S54B, one of the selects one of the sound-generating state Sv and non-sound-generating state Su of the immediately-preceding unit segment Tu which corresponds to a maximum value πBv_max (i.e., greater one) of the probabilities πBvv and πBuv and connects the thus-selected sound-generating state Sv or non-sound-generating state Su to the sound-generating state Sv of the selected unit segment Tu, as shown in FIG. 23. Then, at step S54C, the second processing section 72 calculates a probability ΠB for the sound-generating state Sv of the selected unit segment Tu. The probability ΠB is set at a value corresponding to a probability ΠB previously calculated for the state selected for the immediately-preceding unit segment Tu at step S54B and the maximum value πBv_max identified at step S54B (e.g., set at a sum of respective logarithmic values of the probability ΠB and maximum value πBv_max).

Figure 24:
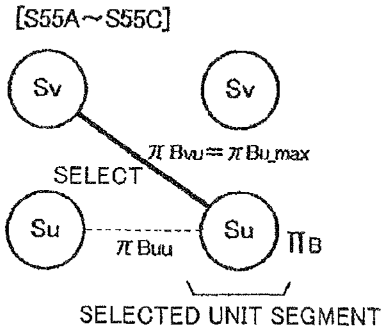
FIG. 24 is a diagram explanatory of probabilities applied to the process performed by the second processing section.

Similarly, for the non-sound-generating state Su of the selected unit segment Tu, the second processing section 72 selects any one of the sound-generating state Sv and non-sound-generating state Su of the immediately-preceding unit segment Tu in accordance with the individual probabilities (PB1_*u*, PB2_*uu* and PB2_*vu*) pertaining to the non-sound-generating state Su of the selected unit segment Tu and then connects the selected sound-generating state Sv or non-sound-generating state Su to the non-sound-generating state Su of the selected unit segment Tu, at step S55A to S55C. Namely, the second processing section 72 calculates, at step S55A, a probability πBuu (i.e., probability with which a transition occurs from the non-sound-generating state Su to the non-sound-generating state Su) corresponding to the probability PB1_*u* and probability PB2_*uu*, and a probability πBvu corresponding to the probability PB1_*u* and probability PB2_*vu*. Then, at step S55B, the second processing section 72 selects any one of the sound-generating state Sv and non-sound-generating state Su of the immediately-preceding unit segment Tu which corresponds to a maximum value πBu_max of the probabilities πBuu and πBvu (sound-generating state Sv in the illustrated example of FIG. 24) and connects the thus-selected state to the non-sound-generating state Su of the selected unit segment Tu. Then, at step S55C, the second processing section 72 calculates a probability ΠB for the non-sound-generating state Su of the selected unit segment Tu in accordance with a probability ΠB previously calculated for the state selected at step S55B and the maximum value πBu_max selected at step S55B.

After having completed the connection with each of the states of the immediately-preceding unit segment Tu (steps S54B and S55B) and calculation of the probabilities ΠB (steps S54C and S55C) in the aforementioned manner, the second processing section 72 makes a determination, at step S56, as to whether the aforementioned process has been completed on all of the K unit segments Tu. With a negative (NO) determination at step S56, the second processing section 72 goes to step S51 to select, as a new selected unit segment Tu, the unit segment Tu immediately following the current selected unit segment Tu, and then the second processing section 72 performs the aforementioned operations of S52 to S56 on the new selected unit segment Tu.

Once the aforementioned process has been completed on all of the K unit segments Tu (YES determination at step S56), the second processing section 72 establishes the path RB extending over the K unit segments Tu, at step S57. More specifically, the second processing section 72 establishes the path RB by sequentially tracking backward the path, set at step S54B or S55B, over the K unit segments Tu from one of the sound-generating state Sv and non-sound-generating state Su that has a greater probability ΠB than the other in the last one of the K unit segments Tu. Then, at step S58, the second processing section 72 establishes the state (sound-generating state Sv or non-sound-generating state Su) of the first unit segment Tu on the path RB extending over the K unit segments Tu, as the state (i.e., presence/absence of sound generation of the target component) of the first unit segment Tu. Thus, the candidate frequency Fc(n) of each unit segment Tu for which the second processing section 72 has affirmed presence of the target component (i.e., the candidate frequency Fc(n) of the unit segment Tu having been determined to be in the sound-generating state Sv) is established as the target frequency Tar (i.e., fundamental frequency F0 of the target component). By the aforementioned processing being performed by the transition analysis section 66 (first and second processing sections 71 and 72) for each of the unit segments Tu, each unit segment Tu where the target component exists and the fundamental frequency (target frequency Tar) of the target component can be identified.

The coefficient train setting section 68 of FIG. 9 generates a processing coefficient train G(t) by setting, at the pass value γ1 (i.e., value causing passage of audio components), each of the coefficient values h(f,t) of the basic coefficient train H(t) of each unit segment Tu which correspond to the M fundamental frequencies F0 detected by the frequency detection section 62 for that unit segment Tu and respective harmonics frequencies of the M fundamental frequencies F0. However, the coefficient train setting section 68 sets, at the suppression value γ0 (i.e., value suppressing audio components), each of the coefficient values h(f,t) corresponding to the target frequency Tar identified by the transition analysis section 66 and harmonics frequencies of the target frequency Tar (2 Ftar, 3 Ftar, . . . ).

By the component suppression process, where the processing section 35 causes the processing coefficient train G(t), generated by the coefficient train setting section 68, to act on the frequency spectra $X_L$ and $X_R$, the frequency spectra $Y_L$ and $Y_R$ of the audio signal y ($y_L$, $y_R$) are generated. As understood from the foregoing, the audio signal y represents a mixed sound comprising: audio components of the audio signal x that are located outside the selected area 148 (particular frequency band range B0); portions immediately following sound generation points of the individual audio components (particularly, percussion instrument sound) included within the selected area 148; and a plurality (M−1) of audio components obtained by removing the target component from a plurality of audio components included within the selected area 148 and having respective harmonic structures. Namely, the audio signal y generated in the aforementioned manner is a signal in which the target component has been selectively suppressed from the audio signal x.

According to the above-described first embodiment, the processing coefficient train G(t) is generated through the processing where, of the coefficient values h(f,t) of the basic coefficient train H(t) that correspond to individual frequencies within the selected area 148 (particular frequency band range B0), those coefficient values h(f,t) of frequencies that correspond to other audio components than the target component are changed to the pass value γ1 that cause passage of audio components. Thus, as compared to the construction where individual frequencies within the selected area 148 are uniformly suppressed, the instant embodiment of the invention can suppress the target component while maintaining the other audio components of the audio signal x, and thus can selectively suppress the target component with an increased accuracy and precision.

More specifically, in the first embodiment, the coefficient values h(f,t), corresponding to frequency components that are among individual frequency components of the audio signal x included within the selected area 148 and that correspond to portions immediately following sound generation points of the audio components, are each set at the pass value γ1. Thus, with the first embodiment, audio components, such as a percussion instrument sound, having a distinguished or prominent sound generation point within the selected area 148 can be maintained even in the audio signal y generated as a result of the execution of the component suppression process. Further, of the M fundamental frequencies F0 detected from the selected area 148 (particular frequency band range B0), the coefficient values h(f,t) corresponding to individual fundamental frequencies F0 other than the target frequency Ftar and harmonic frequencies of the other fundamental frequencies F0 are set at the pass value γ1. Thus, audio components, other than the target component, having respective harmonic structures within the selected area 148 can be maintained even in the audio signal y generated as a result of the execution of the component suppression process.

Further, the transition analysis section 66, which detects the target frequency Ftar, includes the second processing section 72 that determines, per unit segment Tu, presence/absence of the target component in the unit segment Tu, in addition to the first processing section 71 that selects, from among the N candidate frequencies Fc(1) to Fc(N), a candidate frequency Fc(n) having a high degree of likelihood of corresponding to the target component. Namely, the first embodiment can identify transitions of the target component including presence/absence of the target component in the individual unit segments Tu. Thus, as compared to the construction where the transition analysis section 66 includes only the first processing section 71, the first embodiment can minimize a possibility that audio components in unit segments Tu where the target component does not exist are undesirably suppressed.

B. Second Embodiment

Next, a description will be given about a second embodiment of the present invention, where elements similar in construction and function to those in the first embodiment are indicated by the same reference numerals and characters as used for the first embodiment and will not be described in detail here to avoid unnecessary duplication.

The first embodiment has been described as constructed to generate the processing coefficient train G(t) such that portions of sound generation points of audio components and audio components of harmonic structures other than the target component within the selected area 148 (particular frequency band range B0) are caused to pass through the component suppression process. Thus, in the above-described first embodiment, audio components (i.e., "remaining components") that do not belong to any of the portions of sound generation points of audio components and audio components of harmonic structures (including the target component) would be suppressed together with the target component. Because such remaining components are suppressed even in unit segments of the audio signal x where the target component does not exist, there is a likelihood or possibility of the audio signal y, generated as a result of the compression suppression process, undesirably giving an unnatural impression. In view of such a circumstance, the second embodiment of the present invention is constructed to generate the processing coefficient train G(t) such that, in each unit segment Tu where the target component does not exist, all of audio components including the remaining components are caused to pass through the component suppression process.

Figure 25:
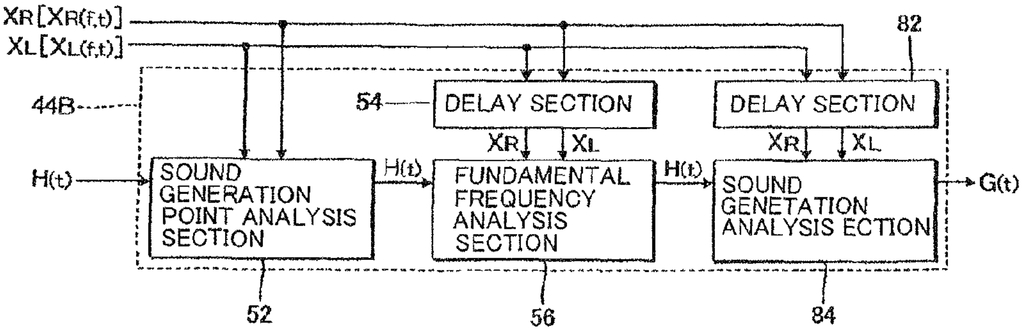
FIG. 25 is a block diagram showing details of a coefficient train processing section in a second embodiment of the audio processing apparatus of the present invention.

As shown in FIG. 25, the second embodiment includes a coefficient train processing section 44B in place of the coefficient train processing section 44A (FIG. 3) provided in the first embodiment. The coefficient train processing section 44B is characterized by inclusion of a delay section 82 and a sound generation analysis section 84, in addition to the same sound generation point analysis section 52, delay section 54 and fundamental frequency analysis section 56 as included in the coefficient train processing section 44A of the first embodiment. A basic coefficient train H(t) generated as a result of the processing by the fundamental frequency analysis section 56 (processing coefficient train G(t) in the first embodiment) is supplied to the sound generation analysis section 84.

The delay section 82 supplies frequency spectra $X_L$ and frequency spectra $X_R$, generated by the frequency analysis section 31, to the sound generation analysis section 84 after delaying the frequency spectra $X_L$ and frequency spectra $X_R$ by a time necessary for the processing by the sound generation point analysis section 52 and fundamental frequency analysis section 56. Thus, the frequency spectra $X_L$ and $X_R$ of each of the unit segments Tu and the basic coefficient train H(t) of that unit segment Tu having been processed by the sound generation point analysis section 52 and fundamental frequency analysis section 56 are supplied in parallel (concurrently) to the sound generation analysis section 84.

Figure 26:
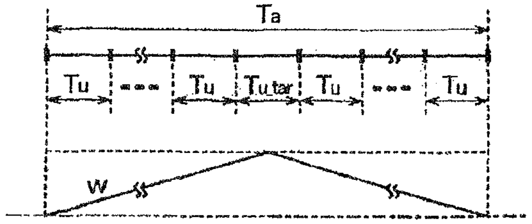
FIG. 26 is a diagram of an analysis portion.

The sound generation analysis section 84 determines, for each of the unit segments Tu, presence/absence of the target component in the audio signal x. Whereas any desired conventionally-known technique may be employed for determining presence/absence of the target component for each of the unit segments Tu, the following description assumes a case where presence/absence of the target component for each of the unit segments Tu is determined with a scheme that uses a character amount θ of the audio signal x within an analysis portion Ta comprising a plurality of the unit segment Tu as shown in FIG. 26. The character amount θ is a variable value that varies, in accordance with acoustic characteristics of the audio signal x, in such a manner that it takes a value differing between a case where the target component (e.g., singing sound) exists in the audio signal x and a case where the target component does not exist in the audio signal x.

Figure 27:
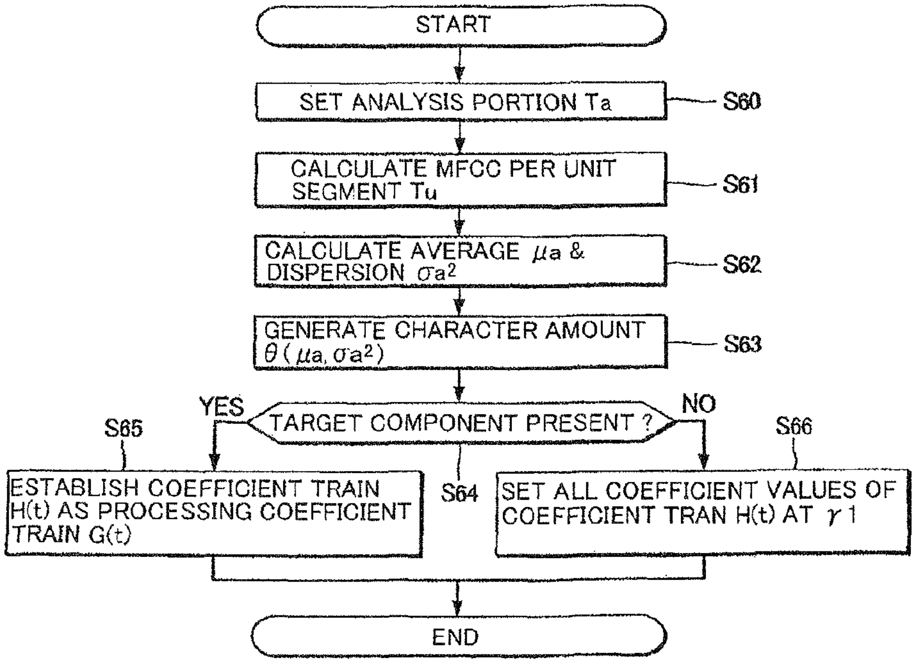
FIG. 27 is a flow chart explanatory of an example operational sequence of a process performed by a sound generation analysis section in the second embodiment.

FIG. 27 is a flow chart explanatory of a process performed by the sound generation analysis section 84, which is performed sequentially for each of the unit segments Tu. Upon start of the process of FIG. 27, the sound generation analysis section 84 sets, at step S60, an analysis portion Ta such that the analysis portion Ta includes one unit segment Tu which is to be made an object of a determination about presence/absence of the target component (such one unit segment Tu will hereinafter be referred to as "object unit segment Tu_tar"). For example, a set of an object unit segment Tu_tar and a predetermined number of unit segments Tu before and behind the object unit segment Tu_tar is set as the analysis portion Ta, as illustratively shown in FIG. 26. The analysis portion Ta is set at a time length of about 0.5 to 1.0 seconds, for example. The analysis portion Ta is updated each time the operation of step S60 is performed in such a manner that adjoining analysis portions Ta overlap each other on the time axis. For example, the analysis portion Ta is shifted rearward by an amount corresponding to one unit segment Tu (e.g., by 0.05 seconds) each time the operation of step S60 is performed.

The sound generation analysis section 84 calculates, at steps S61 to S63, a character amount θ of the analysis portion Ta set at step S60 above. In the following description, let it be assumed that a character amount corresponding to an MFCC of each of the unit segments Tu within the analysis portion Ta is used as the above-mentioned character amount θ of the analysis portion Ta. More specifically, the sound generation analysis section 84 calculates, at step S61, an MFCC for each of the unit segments Tu within the analysis portion Ta of the audio signal x. For example, an MFCC is calculated on the basis of the frequency spectra $X_L$ or frequency spectra $X_R$ of the audio signal x, or the frequency spectra Z obtained by adding together the frequency spectra $X_L$ and $X_R$. However, the MFCC calculation may be performed using any desired scheme. Then, the sound generation analysis section 84 calculates an average μa and dispersion $\sigma a^2$ over the unit segments Tu within the analysis portion Ta, at step S62. For example, the average μa is a weighted average calculated using weightings w that are set, for example, at greater values for unit segments closer to the object unit segment Tu_tar (i.e., that are set at smaller values for unit segments closer to the front end or rear end of the analysis portion Ta); namely, the closer to the object unit segment Tu_tar the unit segment Tu is, the greater value the weighting w is set at. Then, at step S63, the sound generation analysis section 84 generates, as the character amount θ, a vector that has, as vector elements, the average μa and dispersion $\sigma a^2$ calculated at step S62. Note that any other suitable statistical quantities than the average μa and dispersion $\sigma a^2$ may be applied to generation of the character amount θ.

Then, the sound generation analysis section 84 determines, at step S64, presence/absence of the target component in the analysis portion Ta, in accordance with the character amount θ generated at step S63. The SVM (Support Vector Machine) is preferable among others as a technique for determining presence/absence of the target component in the analysis portion Ta in accordance with the character amount θ. More specifically, a separating plane functioning as a boundary between absence and presence of the target component is generated in advance through learning that uses, as learning samples, character amounts θ extracted in a manner similar to steps S61 to S63 above from an audio signal where the target component exists and from an audio signal where the target component does not exist. The sound generation analysis section 84 determines whether the target component exists in a portion of the audio signal x within the analysis portion Ta, by applying the separating plane to the character amount θ generated at step S63.

If the target component exists (is present) within the analysis portion Ta as determined at step S64 (YES determination at step S64), the sound generation analysis section 84 supplies, at step S65, the signal processing section 35 with the basic coefficient train H(t), generated by the fundamental frequency analysis section 56 for the object unit segment Tu_tar, without changing the coefficient train H(t). Thus, as in the first embodiment, portions of sound generation points of audio components and audio components of harmonic structures other than the target component included within the selected area 148 (particular frequency band range B0) are caused to pass through the component suppression process, and the other audio components (i.e., target component and remaining components) are suppressed through the component suppression process.

On the other hand, if the target component does not exist in the analysis portion Ta as determined at step S64 (NO determination at step S64), the sound generation analysis section 84 sets, at the pass value γ1 (i.e., value that causes passage of audio components), all of the coefficient values h(f,t) of the basic coefficient train H(t) generated by the fundamental frequency analysis section 56 for the object unit segment Tu_tar, to thereby generate a processing coefficient train G(t) (step S66). Namely, of the processing coefficient train G(t), the coefficient values g(f,t) to be applied to all frequency bands including the particular frequency band range B0 are each set at the pass value γ1. Thus, all of the audio components of the audio signal x within the object unit segment Tu_tar are caused to pass through the component suppression process. Namely, all of the audio components of the audio signal x are supplied, as the audio signal y (y=x), to the sounding device 18 without being suppressed.

The second embodiment can achieve the same advantageous benefits as the first embodiment. Further, according to the second embodiment, audio components of all frequency bands of the audio signal x in each unit segment Tu where the target component does not exist are caused pass through the component suppression process, and thus, there can be achieved the advantageous benefit of being able to generate the audio signal y that can give an auditorily natural impression. For example, in a case where a singing sound included in the audio signal x of a mixed sound, which comprises the singing sound and accompaniment sounds, is suppressed as the target component, the second embodiment can avoid a partial lack of the accompaniment sounds (i.e., suppression of the remaining components) for each segment where the target component does not exist (e.g., segment of an introduction or interlude), and can thereby prevent degradation of a quality of a reproduced sound.

C. Third Embodiment

In the above-described embodiments, where the coefficient values h(f,t) corresponding to the segment τ immediately following a sound generation point are each set at the pass value $\gamma 1$ by the sound generation point analysis section 52, segments, immediately following sound generation points, of other audio components (such as the singing sound that is the target component) than the percussion instrument sound among the audio components within the selected area 148 are also caused to pass through the component suppression process. By contrast, a third embodiment of the present invention to be described hereinbelow is constructed to set, at the suppression value $\gamma 0$, the coefficient values h(f,t) corresponding to the segment $\tau$ immediately following the sound generation point of the target component.

Figure 28:
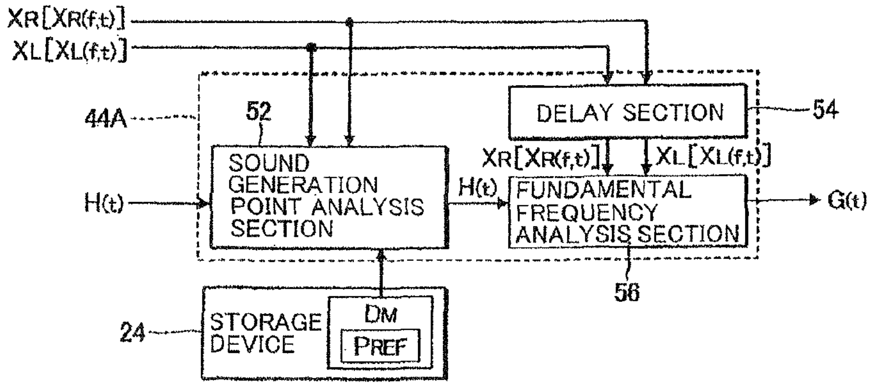
FIG. 28 is a block diagram showing a coefficient train processing section provided in a third embodiment of the audio processing apparatus of the present invention.

FIG. 28 is a block diagram showing the coefficient train processing section 44A and the storage device 24 provided in the third embodiment. The coefficient train processing section 44A in the third embodiment is constructed in the same manner as in the first embodiment (FIG. 3). As shown in FIG. 28, music piece information $D_M$ is stored in the storage device 24. The music piece information $D_M$ designates, in a time-serial manner, tone pitches $P_{REF}$ of individual notes constituting a music piece (such tone pitches $P_{REF}$ will hereinafter be referred to as "reference tone pitches $P_{REF}$". In the following description, let it be assumed that tone pitches of a singing sound representing a melody (guide melody) of the music piece are designated as the reference tone pitches $P_{REF}$. Preferably, the music piece information $D_M$ comprises, for example, a time series of data of the MIDI (Musical Instrument Digital Interface) format, in which event data (note-on event data) designating tone pitches of the music piece and timing data designating processing time points of the individual event data are arranged in a time-serial fashion.

A music piece represented by the audio signal x ($x_L$ and $x_R$) is the same as the music piece represented by the music piece information $D_M$. Thus, a time series of tone pitches represented by the target component (singing sound) of the audio signal x and a time series of the reference tone pitches $P_{REF}$ designated by the music piece information $D_M$ correspond to each other on the time axis. The sound generation point analysis section 52 in the third embodiment uses the time series of the reference tone pitches $P_{REF}$, designated by the music piece information $D_M$, to identify a sound generation point of the target component from among the plurality of sound generation points detected at steps S12A to S12E of FIG. 4.

More specifically, at step S13 of FIG. 4, the sound generation point analysis section 52 estimates, as a sound generation point of the target component, one of the plurality of sound generation points (detected at steps S12A to 12E) which approximates, in terms of the time-axial position of the unit segments Tu, a generation time point of any one of the reference tone pitches $P_{REF}$ (i.e., generation time point of any one of the note-on events) designated by the music piece information $D_M$, and of which the unit frequency band Bu where the sound generation point has been detected approximates the reference tone pitch $P_{REF}$; namely, one of the plurality of sound generation points which is similar in time and tone pitch to the reference tone pitch $P_{REF}$ is estimated to be a sound generation point of the target component. For example, a sound generation point which has been detected for a unit segment Tu within a predetermined time range including the generation point of any one of the reference tone pitches $P_{REF}$ designated by the music piece information $D_M$ and of which the unit frequency band Bu embraces the reference tone pitch $P_{REF}$ is estimated to be a sound generation point of the target component.

The sound generation point analysis section 52 maintains the coefficient values h(f,t) within the unit frequency band Bu corresponding to the sound generation point of the target component, estimated from among the plurality of sound generation points in the aforementioned manner, at the suppression value $\gamma 0$ even in the segment $\tau$ immediately following the sound generation point; namely, for the sound generation point of the target component, the sound generation analysis point section 52 does not change the coefficient value h(f,t) to the pass value $\gamma 1$ even in the segment $\tau$ immediately following the sound generation point. On the other hand, for each of the sound generation points of the other components than the target component, the sound generation point analysis section 52 sets each of the coefficient values h(f,t) at the pass value $\tau 1$ in the segment $\tau$ immediately following the sound generation point, as in the first embodiment (FIG. 8). Thus, of audio components that are to be suppressed with the basic coefficient train H(t) generated by the basic coefficient train generation section 42, segments, immediately following the sound generation points, of the audio components (particularly a percussion instrument sound) other than the target component are caused to pass through the component suppression process. Alternatively, the third embodiment may be constructed to set the coefficient values h(f,t) within the segment $\tau$ at the pass value $\gamma 1$ for all of the sound generation points detected at steps S12A to S12E, and changes, to the suppression value $\gamma 0$ from the pass value $\gamma 1$, the coefficient value h(f,t) corresponding to the sound generation point of the target component.

The above-described third embodiment, in which, for the sound generation point of the target component among the plurality of sound generation points, the coefficient values (f,t) are set at the suppression value $\gamma 0$ even in the segment $\tau$, can advantageously suppress the target component with a higher accuracy and precision than the first embodiment. Note that the construction of the third embodiment, in which the sound generation point analysis section 52 sets the coefficients h(f,t) at the suppression value $\gamma 0$ for the sound generation point of the target component, is also applicable to the second embodiment. In addition to the above-described construction, representative or typical acoustic characteristics (e.g., frequency characteristics) of the target component and other audio components than the target component may be stored in advance in the storage device 24, so that a sound generation point of the target component can be estimated through comparison made between acoustic characteristics, at individual sound generation points, of the audio signal x and the individual acoustic characteristics stored in the storage device 24.

D. Fourth Embodiment

The third embodiment has been described above on the assumption that there is temporal correspondency between a time series of tone pitches of the target component of the audio signal x and the time series of the reference tone pitches $P_{REF}$ (hereinafter referred to as "reference tone pitch train"). Actually, however, the time series of tone pitches of the target component of the audio signal x and the time series of the reference tone pitch train sometimes do not completely correspond to each other. Thus, a fourth embodiment to be described hereinbelow is construct to adjust a relative position (on the time axis) of the reference tone pitch train to the audio signal x.

Figure 29:
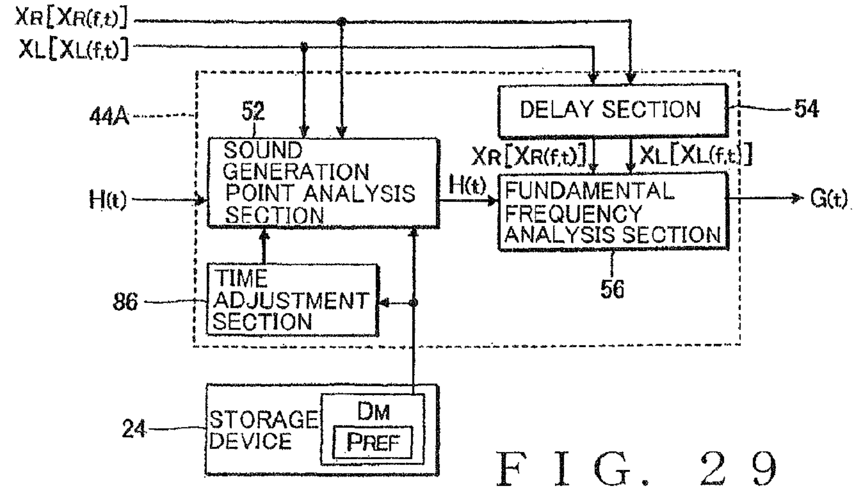
FIG. 29 is a block diagram showing a coefficient train processing section provided in a fourth embodiment of the audio processing apparatus of the present invention.

FIG. 29 is a block diagram showing the coefficient train processing section 44A provided in the fourth embodiment. The coefficient train processing section 44A in the fourth embodiment includes a time adjustment section 86, in addition to the same components (i.e., sound generation point analysis section 52, delay section 54 and fundamental frequency analysis section 56) as the coefficient train processing section 44A in the third embodiment. The storage device 24 stores therein music piece information $D_M$ as in the third embodiment.

The time adjustment section 86 determines a relative position (time difference) between the audio signal x (individual unit segments Tu) and the reference tone pitch train designated by the music piece information $D_M$, designated by the music piece information $D_M$ stored in the storage device 24, in such a manner that the time series of tone pitches of the target component of the audio signal x and the reference tone pitch train correspond to each other on the time axis. Whereas any desired scheme or technique may be employed for adjustment, on the time axis, between the audio signal x and the reference tone pitch train, let it be assumed in the following description that the fourth embodiment employs a scheme of comparing a time series of fundamental frequencies Ftar (hereinafter referred to as "analyzed tone pitch train") identified by the transition analysis section 66 in generally the same manner as in the first embodiment or second embodiment. The analyzed tone pitch train is a time series of fundamental frequencies Ftar identified without the processed results of the time adjustment section 86 (i.e., temporal correspondency with the reference tone pitch train) being taken into account.

The time adjustment section 86 calculates a mutual correlation function C(Δ) between the analyzed tone pitch train of the entire audio signal x and the reference tone pitch train of the entire music piece, with a time difference Δ therebetween used as a variable, and identifies a time difference ΔA with which a function value (mutual correlation) of the mutual correlation function C(Δ) becomes the greatest. For example, the time difference Δ at a time point when the function value of the mutual correlation function C(Δ) changes from an increase to a decrease is determined as the time difference ΔA. Alternatively, the time adjustment section 86 may determine the time difference ΔA after smoothing the mutual correlation function C(Δ). Then, the time adjustment section 86 delays (or advances) one of the analyzed tone pitch train and the reference tone pitch train behind (or ahead of) the other by the time difference ΔA.

The sound generation point analysis section 52 uses the analyzed results of the time adjustment section 86 to estimate a sound generation point of the target component from among the sound generation points identified at steps S12A to S12E. Namely, with the time difference Δ imparted to the analyzed tone pitch train and reference tone pitch train, the sound generation point analysis section 52 compares the unit segments Tu where the individual sound generation points have been detected of the analyzed tone pitch train and the individual reference tone pitches $P_{REF}$ of the reference tone pitch train, to thereby estimate, as a sound generation point of the target component, each sound generation point similar in time point and tone pitch to any one of the reference tone pitch $P_{REF}$. Behavior of the fundamental frequency analysis section 56 is similar to that in the first embodiment. However, as understood from the foregoing, the sound generation point analysis section 52 (transition analysis section 66) sequentially performs a path search for the time adjustment 86 to identify the analyzed tone pitch train to be compared against the reference tone pitch train and a path search for processing the basic coefficient train H(t) having been processed by the sound generation point analysis section 52.

The above-described fourth embodiment, where the time adjustment section 86 estimates each sound generation point of the target component by comparing the audio signal x and the reference tone pitch train having been adjusted in time-axial position by the time adjustment section 86, can advantageously identify each sound generation point of the target component with an increased accuracy and precision even where the time-axial positions of the audio signal x and the reference tone pitch train do not correspond to each other.

Whereas the fourth embodiment has been described above as comparing the analyzed tone pitch train and the reference tone pitch train for the entire music piece, it may compare the analyzed tone pitch train and the reference tone pitch train only for a predetermined portion (e.g., portion of about 14 or 15 seconds from the head) of the music piece to thereby identify the time difference ΔA. As another alternative, the analyzed tone pitch train and the reference tone pitch train may be segmented from the respective heads at every predetermined time interval so that corresponding train segments of the analyzed tone pitch train and the reference tone pitch train are compared to calculate the time difference ΔA for each of the train segments. By thus calculating the time difference ΔA for each of the train segments, the fourth embodiment can advantageously identify correspondency between the analyzed tone pitch train and the reference tone pitch train with an increased accuracy and precision even where the analyzed tone pitch train and the reference tone pitch train differ from each other in tempo.

E. Fifth Embodiment

Figure 30:
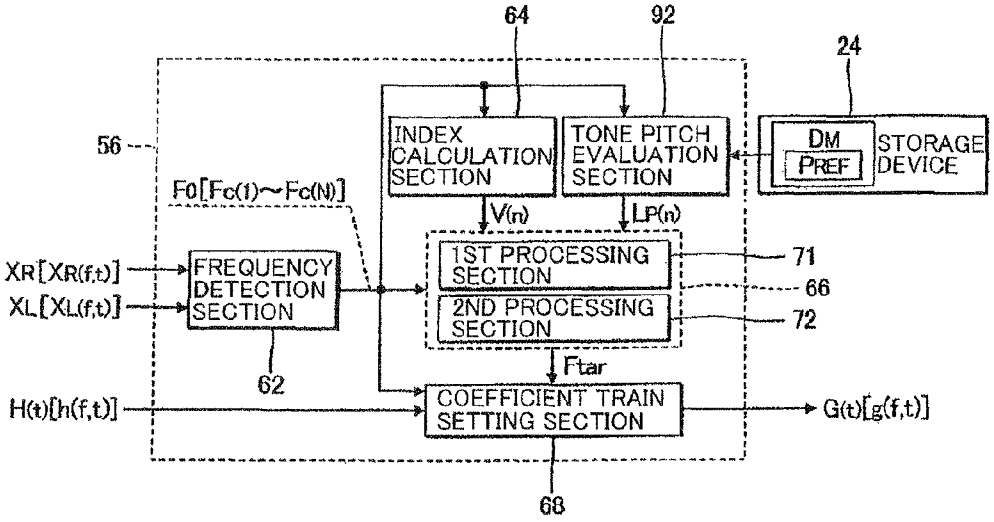
FIG. 30 is a block diagram showing a fundamental frequency analysis section provided in a fifth embodiment of the audio processing apparatus of the present invention.

FIG. 30 is a block diagram showing the fundamental frequency analysis section 56 and the storage device 24 provided in a fifth embodiment of the present invention. The storage device 24 stores therein music piece information $D_M$ as in the third embodiment. The fundamental frequency analysis section 56 in the fifth embodiment uses the time series of the reference tone pitch $P_{REF}$, designated by the music piece information $D_M$, to identify a time series of fundamental frequencies Ftar of the target component of the audio signal x.

As shown in FIG. 30, the fundamental frequency analysis section 56 in the fifth embodiment includes a tone pitch evaluation section 92, in addition to the same components (i.e., frequency detection section 62, index calculation section 64, transition analysis section 66 and coefficient train setting section 68) as in the first embodiment. The tone pitch evaluation section 92 calculates, for each of the unit segments Tu, tone pitch likelihoods $L_P(n)$($L_P(1)$–$L_P(N)$) for individual ones of the N candidate frequencies Fc(1)-Fc(N) identified by the frequency detection section 62. The tone pitch likelihood $L_P(n)$ of each of the unit segments Tu is in the form of a numerical value corresponding to a difference between the reference tone pitch $P_{REF}$ designated by the music piece information $D_M$ for a time point of the music piece corresponding to that unit segment Tu and the candidate frequency Fc(n) detected by the frequency detection section 62. In the fifth embodiment, where the reference tone pitches $P_{REF}$ correspond to a singing sound of the music piece, the tone pitch likelihood $L_P(n)$ functions as an index of a degree of possibility (likelihood) of the candidate frequency Fc(n) corresponding to the singing sound of the music piece. For example, the tone pitch likelihood $L_P(n)$ is selected from within a predetermined range of positive values equal to and less than "1" such that it takes a greater value as the difference between the candidate frequency Fc(n) and the reference tone pitch $P_{REF}$ decreases.

Figure 31:
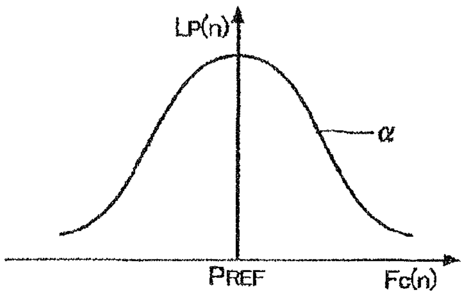
FIG. 31 is a diagram explanatory of a process performed by a tone pitch evaluation section in the fifth embodiment for selecting a tone pitch likelihood.

FIG. 31 is a diagram explanatory of a process performed by the tone pitch evaluation section 92 for selecting the tone pitch likelihood $L_P(n)$. In FIG. 31, there is shown a probability distribution α with the candidate frequency Fc(n) used as a random variable. The probability distribution α is, for example, a normal distribution with the reference tone pitch $P_{REF}$ as an average value. The horizontal axis (random variable of the probability distribution α) of FIG. 31 represents candidate frequencies Fc(n) in cents.

The tone pitch evaluation section 92 identifies, as the tone pitch likelihood $L_P(n)$, a probability corresponding to a candidate frequency Fc(n) in the probability distribution α, for a portion of the music piece where the music piece information $D_M$ designates a reference tone pitch $P_{REF}$ (i.e., where the singing sound exists within the music piece). On the other hand, for a segment of the music piece where the music piece information $D_M$ does not designate a reference tone pitch $P_{REF}$ (i.e., where the singing sound does not exist within the music piece), the tone pitch evaluation section 92 sets the tone pitch likelihood $L_P(n)$ at a predetermined lower limit value.

The frequency of the target component can vary (fluctuate) over time about a predetermined frequency because of a musical expression, such as a vibrato. Thus, a shape (more specifically, dispersion) of the probability distribution α is selected such that, within a predetermined range centering on the reference tone pitch $P_{REF}$ (i.e., within a predetermined range where variation of the frequency of the target component is expected), the tone pitch likelihood $L_P(n)$ may not take an excessively small value. For example, frequency variation due to a vibrato of the singing sound covers a range of four semitones (two semitones on a higher-frequency side and two semitones on a lower-frequency side) centering on the target frequency. Thus, the dispersion of the probability distribution α is set to a frequency width of about one semitone relative to the reference tone pitch $P_{REF}$ ($P_{REF} \times 2^{1/12}$) in such a manner that, within a predetermined range of about four semitones centering on the reference tone pitch $P_{REF}$, the tone pitch likelihood $L_P(n)$ may not take an excessively small value. Note that, although frequencies in cents are represented on the horizontal axis of FIG. 31, the probability distribution α, where frequencies are represented in hertz (Hz), differs in shape (dispersion) between the higher-frequency side and lower-frequency side sandwiching the reference tone pitch $P_{REF}$.

The first processing section 71 of FIG. 30 reflects the tone pitch likelihood $L_P(n)$, calculated by the tone pitch evaluation section 92, in the probability $\pi_A(v)$ calculated for each candidate frequency Fc(n) at step S44 of FIG. 16. More specifically, the first processing section 71 calculates, as the probability $\pi_A(v)$, a sum of respective logarithmic values of the probabilities $P_A1(n)$ and $P_A2(n)$ calculated at step S42 of FIG. 16, probability $P_A3(n)\_v$ calculated at step S43 and tone pitch likelihood $L_P(n)$ calculated by the tone pitch evaluation section 92.

Thus, the higher the tone pitch likelihood $L_P(n)$ of the candidate frequency Fc(n), the greater value does take the probability $\Pi_A(n)$ calculated at step S46. Namely, if the candidate frequency Fc(n) has a higher tone pitch likelihood $L_P(n)$ (namely, if the candidate frequency Fc(n) has a higher likelihood of corresponding to the singing sound of the music piece), the possibility of the candidate frequency Fc(n) being selected as a frequency on the estimated path $R_A$. As explained above, the first processing section 71 in the fifth embodiment functions as a means for identifying the estimated path $R_A$ through a path search using the tone pitch likelihood $L_P(n)$ of each of the candidate frequencies Fc(n).

Further, the second processing section 72 of FIG. 30 reflects the tone pitch likelihood $L_P(n)$, calculated by the tone pitch evaluation section 92, in the probabilities $\pi_Bvv$ and $\pi_Buv$ calculated for the sound-generating state Sv at step S54A of FIG. 20. More specifically, the second processing section 72 calculates, as the probability $\pi_Bvv$, a sum of respective logarithmic values of the probability $P_B1\_v$ calculated at step S52, probability $B2\_vv$ calculated at step S53 and tone pitch likelihood $L_P(n)$ of the candidate frequency Fc(n), corresponding to the selected unit segment Tu, of the estimated path $R_A$. Similarly, the probability $\pi_Buv$ is calculated in accordance with the probability $P_B1\_v$, probability $B2\_uv$ and tone pitch likelihood $L_P(n)$.

Thus, the higher the tone pitch likelihood $L_P(n)$ of the candidate frequency Fc(n), the greater value does take the probability $\Pi_B$ calculated in accordance with the probability $\pi_Bvv$ or $\pi_Buv$ calculated at step S54C. Namely, the sound-generating state Sv of the candidate frequency Fc(n) having a higher tone pitch likelihood $L_P(n)$ has a higher possibility of being selected as the state train $R_B$. On the other hand, for the candidate frequency Fc(n) within each unit segment Tu where no audio component of the reference tone pitch $P_{REF}$ of the music piece exists, the tone pitch likelihood $L_P(n)$ is set at the lower limit value; thus, for each unit segment Tu where no audio component of the reference tone pitch $P_{REF}$ exists (i.e., unit segment Tu where the non-sound-generating state Su is to be selected), it is possible to sufficiently reduce the possibility of the sound-generating state Sv being erroneously selected. As explained above, the second processing section 72 in the fifth embodiment functions as a means for identifying the state train $R_B$ through the path search using the tone pitch likelihood $L_P(n)$ of each of the candidate frequencies Fc(n) on the estimated path $R_A$.

Because, in the fifth embodiment, the tone pitch likelihoods $L_P(n)$ corresponding to differences between the individual candidate frequencies Fc(n) and the reference tone pitches $P_{REF}$ designated by the music piece information $D_M$ are applied to the path searches for the estimated path $R_A$ and state train $R_B$, the fifth embodiment can enhance an accuracy and precision with which to estimate the fundamental frequency Ftar of the target component, as compared to a conventional construction where the tone pitch likelihoods $L_P(n)$ are not used. Alternatively, however, the fifth embodiment may be constructed in such a manner that the tone pitch likelihoods $L_P(n)$ are reflected in only one of the search for the estimated path $R_A$ by the first processing section 71 and the search for the state train $R_B$ by the second processing section 72.

Note that, because the tone pitch likelihood $L_P(n)$ is similar in nature to the characteristic index value V(n) from the standpoint of an index indicative of a degree of likelihood of corresponding to the target component (singing sound), the tone pitch likelihood $L_P(n)$ may be applied in place of the characteristic index value V(n) (i.e., the index calculation section 64 may be omitted from the construction shown in FIG. 30). Namely, in such a case, the probability $P_A2(n)$ calculated in accordance with the characteristic index value V(n) at step S42 of FIG. 16 is replaced with the tone pitch likelihood $L_P(n)$, and the probability $P_B1\_v$ calculated in accordance with the characteristic index value V(n) at step S52 of FIG. 20 is replaced with the tone pitch likelihood $L_P(n)$.

The music piece information $D_M$ stored in the storage device 24 may include a designation (track) of a time series of the reference tone pitches $P_{REF}$ for each of a plurality of parts of the music piece, in which case the calculation of the tone pitch likelihood $L_P(n)$ of each of the candidate frequencies Fc(n) and the searches for the estimated path $R_A$ and state train $R_B$ can be performed per part of the music piece. More specifically, per unit segment Tu, the tone pitch evaluation section 92 calculates, for each of the plurality of parts of the music piece, tone pitch likelihoods $L_P(n)$ ($L_P(1)$–$L_P(n)$) corresponding to the differences between the reference tone pitches $P_{REF}$ and the individual candidate frequencies Fc(n) of the part. Then, for each of the plurality of parts, the searches for the estimated path $R_A$ and state train $R_B$ using the individual tone pitch likelihoods $L_P(n)$ of that part are performed in the same manner as in the above-described fifth embodiment. The above-described arrangements can generate a time series of the fundamental frequencies Ftar (frequency information $D_F$), for each of the plurality of parts of the music piece.

Whereas the foregoing has described various constructions based on the first embodiment, the construction of the fifth embodiment provided with the tone pitch evaluation section 92 is also applicable to the second to fourth embodiments. For example, the time adjustment section 86 in the fourth embodiment may be added to the fifth embodiment. In such a case, the tone pitch evaluation section 92 calculates, for each of the unit segments Tu, a tone pitch likelihood $L_P(n)$ by use of the analyzed results of the time adjustment section 86. More specifically, the tone pitch evaluation section 92 calculates the tone pitch likelihood $L_P(n)$ in accordance with a difference between the candidate frequency Fc(n) detected by the frequency detection section 62 for each of the unit segments Tu and the reference tone pitch $P_{REF}$ located at the same time position as the unit segment Tu in the reference tone pitch train having been adjusted (i.e., imparted with the time difference $\Delta A$) by the time adjustment section 86. With such an arrangement, it is possible to identify a time series of the fundamental frequencies Ftar with an increased accuracy and precision even where time axial positions of the audio signal x and the reference tone pitch train do not correspond to each other.

F. Sixth Embodiment

Figure 32:
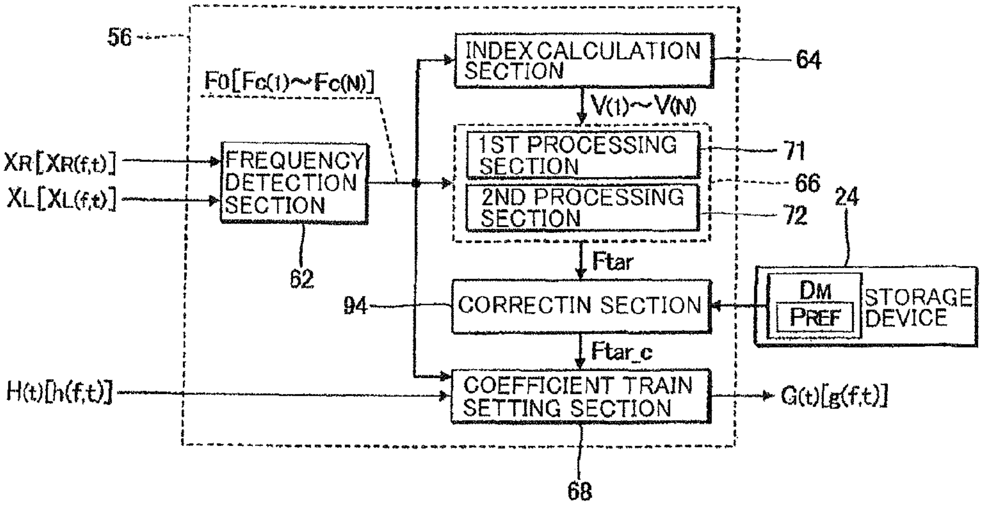
FIG. 32 is a block diagram showing a fundamental frequency analysis section provided in a sixth embodiment of the audio processing apparatus of the present invention.

FIG. 32 is a block diagram showing the fundamental frequency analysis section 56 provided in the sixth embodiment. The fundamental frequency analysis section 56 in the sixth embodiment includes a correction section 94, in addition to the same components (i.e., frequency detection section 62, index calculation section 64, transition analysis section 66 and coefficient train setting section 68) as in the first embodiment. The correction section 94 generates a fundamental frequency Ftar_c ("c" means "corrected") by correcting the fundamental frequency Ftar identified by the transition analysis section 66. As in the fifth embodiment, the storage device 24 stores therein music piece information $D_M$ designating, in a time-serial fashion, reference tome pitches $P_{REF}$ of the same music piece as represented by the audio signal x.

Figure 33A:
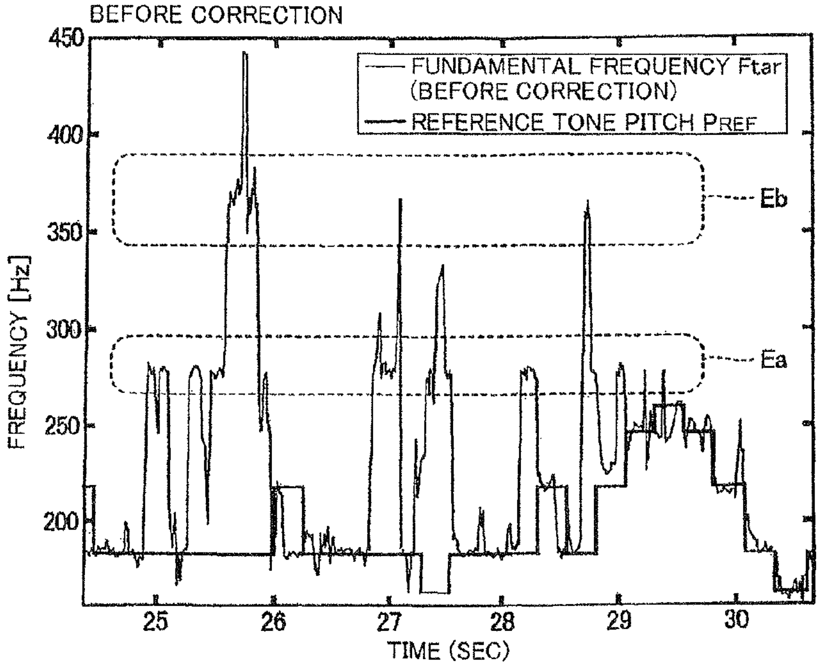
FIGS. 33A and 33B are graphs showing relationship between fundamental frequencies and reference tone pitches before and after correction by a correction section.

FIG. 33A is a graph showing a time series of the fundamental frequencies Ftar identified in the same manner as in the first embodiment, and the time series of the reference tome pitches $P_{REF}$ designated by the music piece information $D_M$. As seen from FIG. 33A, there can arise a case where a frequency about one and half times as high as the reference tome pitch $P_{REF}$ is erroneously detected as the fundamental frequency Ftar as indicated by a reference character "Ea" (such erroneous detection will hereinafter be referred to as "five-degree error"), and a case where a frequency about two times as high as the reference tome pitch $P_{REF}$ is erroneously detected as the fundamental frequency Ftar as indicated by a reference character "Eb" (such erroneous detection will hereinafter be referred to as "octave error"). Such a five-degree error and octave error are assumed to be due to the facts among others that harmonics components of the individual audio components of the audio signal x overlap one another and that an audio component at an interval of one octave or an fifth tends to be generated within the music piece for musical reasons.

The correction section 94 of FIG. 32 generates a fundamental frequency Ftar_c by correcting the above-mentioned error (particularly, five-degree error and octave error) produced in the fundamental frequency Ftar. More specifically, the correction section 94 generates, for each of the unity segments Tu, a corrected fundamental frequency Ftar_c by multiplying the fundamental frequency Ftar by a correction value β as represented by mathematical expression (13) below.

$$F\text{tar}\_c=\beta\cdot F\text{tar} \tag{13}$$

However, it is not appropriate to correct the fundamental frequency Ftar when there has occurred a difference between the fundamental frequency Ftar and the reference tome pitch $P_{REF}$ due to a musical expression, such as a vibrato, of the singing sound. Therefore, when the fundamental frequency Ftar is within a predetermined range relative to the reference tome pitch $P_{REF}$ designated at a time point of the music piece corresponding to the fundamental frequency Ftar, the correction section 94 determines the fundamental frequency Ftar as the fundamental frequency Ftar_c without correcting the fundamental frequency Ftar. Further, when the fundamental frequency Ftar is, for example, within a range of about three semitones on the higher-pitch side relative to the reference tome pitch $P_{REF}$ (i.e., within a variation range of the fundamental frequency Ftar assumed as a musical expression, such as a vibrato), the correction section 94 does not perform the correction based on mathematical expression (13) above.

Figure 34:
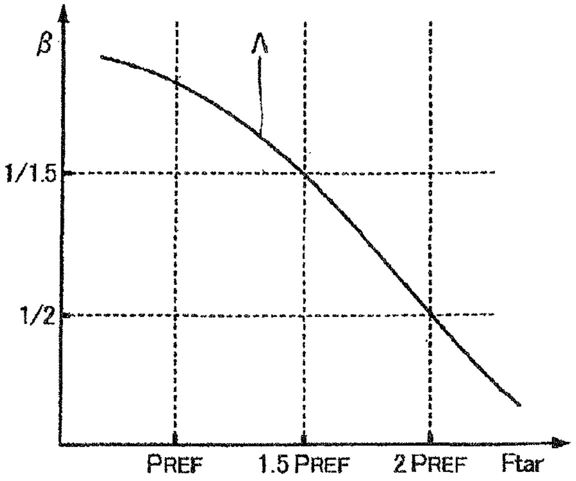
FIG. 34 is a graph showing relationship between fundamental frequencies and correction values.

The correction value β in mathematical expression (13) is variably set in accordance with the fundamental frequency Ftar. FIG. 34 is a graph showing a curve of functions Λ defining relationship between the fundamental frequency Ftar (horizontal axis) and the correction value β (vertical axis). In the illustrated example of FIG. 34, the curve of functions Λ shows a normal distribution. The correction section 94 selects a function (e.g., average and dispersion of the normal distribution) Λ in accordance with the reference tome pitch $P_{REF}$ designated by the music piece information $D_M$ in such a manner that the correction value β is 1/1.5 (≈0.67) for a frequency one and half times as high as the reference tome pitch $P_{REF}$ designated at the time point corresponding to the fundamental frequency Ftar (Ftar=1.5 $P_{REF}$) and the correction value β is ½ (=0.5) for a frequency two times as high as the reference tome pitch $P_{REF}$ (Ftar=2 $P_{REF}$).

Figure 33B:
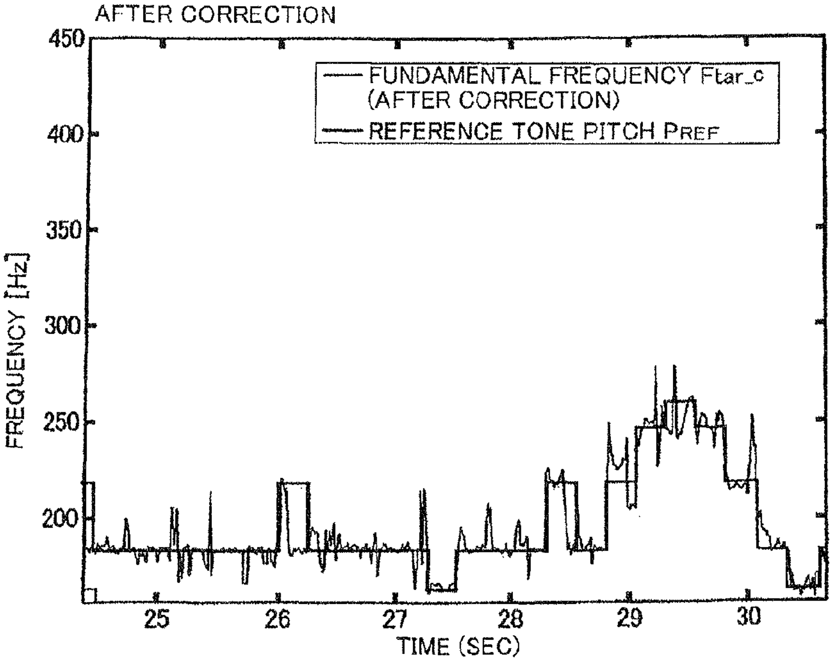

The correction section 94 of FIG. 32 identifies the correction value β corresponding to the fundamental frequency Ftar on the basis of the function Λ corresponding to the reference tome pitch $P_{REF}$ and applies the thus-identified correction value β to mathematical expression (13) above. Namely, if the fundamental frequency Ftar is one and half times as high as the reference tome pitch $P_{REF}$, the correction value β in mathematical expression (13) is set at 1/1.5, and, if the fundamental frequency Ftar is two times as high as the reference tome pitch $P_{REF}$, the correction value β in mathematical expression (13) is set at ½. Thus, as shown in FIG. 33B, the fundamental frequency Ftar erroneously detected as about one and half times as high as the reference tome pitch $P_{REF}$ due to the five-degree error or the fundamental frequency Ftar erroneously detected as about two times as high as the reference tome pitch $P_{REF}$ due to the octave error can each be corrected to a fundamental frequency Ftar_c close to the reference tome pitch $P_{REF}$. The coefficient train setting section 68 generates a processing coefficient train G(t) in accordance with the corrected fundamental frequencies Ftar_c output from the correction section 94.

The sixth embodiment, where the time series of the fundamental frequencies Ftar analyzed by the transition analysis section 66 is corrected in accordance with the individual reference tone pitches $P_{REF}$ as seen from the foregoing, can accurately detect the fundamental frequencies Ftar_c of the target component as compared to the first embodiment. Because the correction value β where the fundamental frequency Ftar is one and half times as high as the reference tome pitch $P_{REF}$ is set at 1/1.5 and the correction value β where the fundamental frequency Ftar is two times as high as the reference tome pitch $P_{REF}$ is set at ½ as noted above, the sixth embodiment can effectively correct the five-degree error and octave error that tend to be easily produced particularly at the time of estimation of the fundamental frequency Ftar.

Whereas the foregoing has described various constructions based on the first embodiment, the construction of the sixth embodiment provided with the correction section 94 is also applicable to the second to fifth embodiments, and the time adjustment section 86 may be added to the fifth embodiment. The correction section 94 corrects the fundamental frequency Ftar by use of the analyzed result of the time adjustment section 86. The correction section 94 selects a function Λ in such a manner that the correction value β is set at 1/1.5 if the fundamental frequency Ftar in any one of the unit segments Tu is one and half times as high as the reference tone pitch $P_{REF}$ located at the same time point as that unit segment Tu in the reference tone pitch train having been adjusted by the time adjustment section 86, and that the correction value β is set at ½ if the fundamental frequency Ftar is two times as high as the reference tone pitch $P_{REF}$. With such an arrangement, it is possible to correct the fundamental frequency Ftar with an increased accuracy and precision even when the time axial positions of the audio signal x and the reference tone pitch train do not correspond to each other.

Further, whereas the correction value β has been described above as being determined using the function Λ indicative of a normal distribution, the scheme for determining the correction value β may be modified as appropriate. For example, the correction value β may be set at 1/1.5 if the fundamental frequency Ftar is within a predetermined rage including a frequency that is one and half times as high as the reference tone pitch $P_{REF}$ (e.g., within a range of a frequency band width that is about one semitone centering on the reference tone pitch $P_{REF}$) (i.e., in a case where occurrence of a five-degree error is assumed), and the correction value β may be set at ½ if the fundamental frequency Ftar is within a predetermined rage including a frequency that is two times as high as the reference tone pitch $P_{REF}$ (i.e., in a case where occurrence of a one octave error is assumed). Namely, it is not necessarily essential for the correction value β to vary continuously relative to the fundamental frequencies Ftar.

G. Modifications

The above-described embodiments may be modified as exemplified below, and two or more of the following modifications may be combined as desired.

(1) Modification 1:

Any one of the sound generation point analysis section 52 and fundamental frequency analysis section 56 may be dispensed with, and the positions of the sound generation point analysis section 52 and fundamental frequency analysis section 56 may be reversed. Further, the above-describe second embodiment may be modified in such a manner that the sound generation point analysis section 52 and fundamental frequency analysis section 56 are deactivated for each unit segment Tu having been determined by the sound generation analysis section 84 as not including the target component.

(2) Modification 2:

The index calculation section 64 may be dispensed with. In such a case, the characteristic index value V(n) is not applied to the identification, by the first processing section 71, of the path $R_A$. Namely, the calculation of the probability $P_A2(n)$ at step S42 is dispensed with, so that the estimated train $R_A$ is identified in accordance with the probability $P_A1(n)$ corresponding to the degree of likelihood Ls(Fc(n)) and the probability $P_A3(n)\_v$ corresponding to the frequency difference ε between adjoining unit segments Tu.

(3) Modification 3:

The means for calculating the characteristic index value V(n) in the first embodiment and means for determining presence/absence of the target component in the second embodiment are not limited to the SVM (Support Vector Machine). For example, a construction using results of learning by a desired conventionally-known technique, such as the k-means algorithm, can achieve the calculation of the characteristic index value V(n) (classification or determination as to correspondency to the target component) in the first embodiment and determination of presence/absence of the target component in the second embodiment.

(4) Modification 4:

The frequency detection section 62 may detect the M fundamental frequencies F0 using any desired scheme. For example, as shown in Japanese Patent Application Laid-open Publication No. 2001-125562, a PreFEst construction may be employed in which the audio signal x is modeled as a mixed distribution of a plurality of sound models indicating harmonics structures of different fundamental frequencies, a probability density function of fundamental frequencies is estimated on the basis of weighting values of the individual sound models, and then M fundamental frequencies F0 where peaks of the probability density function exist are identified.

Figure 35:
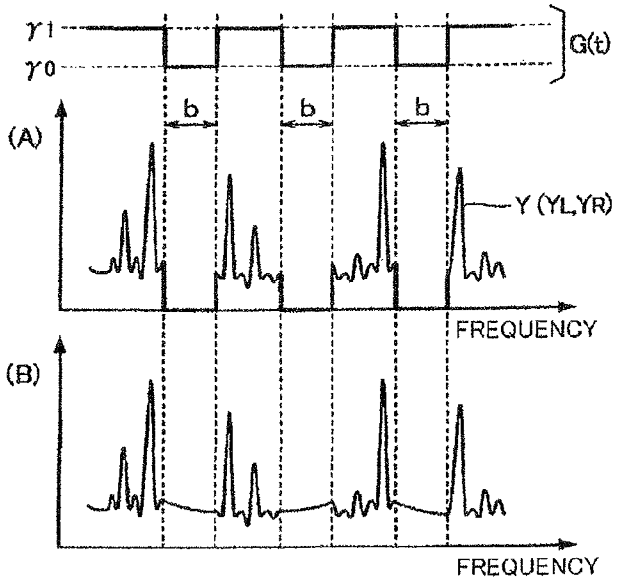
FIG. 35 is a diagram explanatory of a process performed by a signal processing section in a modification of the audio processing apparatus of the present invention.

(5) Modification 5:

The frequency spectra Y ($Y_L$, $Y_R$) generated as a result of the execution of the component suppression process using the processing coefficient train G(t) may undesirably degrade a quality of a reproduced sound because a rapid intensity variation occurs due to a difference between the suppression value γ0 and pass value γ1 of the coefficient value g(f,t), as shown in (A) of FIG. 35. Thus, there may be employed an alternative construction where the signal processing section 35 interpolates between components within frequency bands b of the frequency spectra Y which correspond to the suppression values γ0 of the processing coefficient train G(t). Any desired interpolation technique, such as the spline interpolation, may be employed for the interpolation of the frequency spectra Y Further, any desired method or scheme may be employed for determining phase angles within the frequency band b, such as one where phase angles of the frequency spectra X ($X_L$, $X_R$) before the execution of the component suppression process are applied, one where interpolation is made between phase angles on opposite sides of the frequency band b, or one where phase angles within the frequency band b are set randomly.

(6) Modification 6:

Whereas the above-described embodiments have been described above in relation to the case where the frequency detection section 62 selects, as the candidate frequencies Fc(1)-Fc(N), the N fundamental frequencies F0 of the M fundamental frequencies F0 in the descending order of the degrees of likelihood Ls(δF) (see step S27 of FIG. 10), any desired scheme may be employed for identifying the N candidate frequencies Fc(1)-Fc(N). For example, there may be employed a scheme in which the index calculation section 64 calculates the characteristic index values V for the M fundamental frequencies F0 identified at step S27 and then identifies, as the candidate frequencies Fc(1)-Fc(N), the N fundamental frequencies F0 having great characteristic index values V (great degrees of likelihood of corresponding to the target component) from among the M fundamental frequencies F0.

(7) Modification 7:

Whereas the above-described embodiments have been described above in relation to the audio processing apparatus 100 which includes both the coefficient train generation section 33 that generates the processing coefficient train G(t) and the signal processing section 35 that applies the processing coefficient train G(t) to the audio signal x, the present invention may be implemented as an audio processing apparatus or processing coefficient train generation apparatus that generates the processing coefficient train G(t). The processing coefficient train G(t) generated by the processing coefficient train generation apparatus is supplied to the signal processing section 35, provided in another audio processing apparatus, to be used for processing of the audio signal x (i.e., for suppression of the target component).

(8) Modification 8:

It is also advantageous for the coefficient train processing section 44 (44A, 44B) to modify the processing coefficient train G(t) to generate a processing coefficient train Ge(t) ("e" means enhancing) for enhancing or emphasizing the target component. Such a processing coefficient train Ge(t) is applied to the processing by the signal processing section 35. More specifically, each coefficient value of the target-component-enhancing processing coefficient train Ge(t) is set at a value obtained by subtracting a coefficient value g(f,t) of the target-component-suppressing processing coefficient train G(t) from the pass value γ1. Namely, of the target-component-enhancing processing coefficient train Ge(t), a coefficient value of the processing coefficient train Ge(t) corresponding to each frequency f at which the target component exists in the audio signal x is set at a great value for causing passage of audio components, while a coefficient value of the processing coefficient train Ge(t) corresponding to each frequency f at which the target component does not exist is set at a small value for suppressing audio components.

This application is based on, and claims priorities to, JP PA 2010-242244 filed on 28 Oct. 2010 and JP PA 2011-045974 filed on 3 Mar. 2011. The disclosure of the priority applications, in its entirety, including the drawings, claims, and the specification thereof, are incorporated herein by reference.

What is claimed is:

1. An audio processing apparatus for generating, for each of unit segments of an audio signal, a processing coefficient train having coefficient values set for individual frequencies such that a target component of the audio signal is suppressed, said audio processing apparatus comprising:

a processor configured to:

generate a basic coefficient train where basic coefficient values corresponding to individual frequencies included within a particular frequency band range are each set at a suppression value that suppresses the audio signal while basic coefficient values corresponding to individual frequencies outside the particular frequency band range are each set at a pass value that maintains the audio signal;

process the generated basic coefficient train in such a manner that, when a sound generation point of any one of frequency components included within the particular frequency band range is detected, the basic coefficient values corresponding to a frequency of the one frequency component are each set at the pass value over a predetermined time period from the detected sound generation point; and generate the processing coefficient train for each of the unit segments by changing, to the pass value, each of the basic coefficient values included in the processed basic coefficient train and corresponding to individual frequencies other than the target component among said basic coefficient values corresponding to the individual frequencies included within the particular frequency band range.

2. The audio processing apparatus as claimed in claim 1, which further comprises a storage section storing therein a time series of reference tone pitches, and wherein, for each of sound generation points corresponding to a time series of reference tone pitches among sound generation points of the individual frequency components included within the particular frequency band range, said processor is configured to set the coefficient values at the suppression value even in the predetermined time period from the sound generation point.

3. The audio processing apparatus as claimed in claim 1, wherein said processor is configured to generate a basic coefficient train where basic coefficient values corresponding to individual frequencies of components localized in a predetermined direction within the particular frequency band range are each set at the suppression value while coefficient values corresponding to other frequencies than the frequencies of the components localized in the predetermined direction are each set at the pass value.

4. The audio processing apparatus as claimed in claim 1, wherein said processor is configured to generate the processing coefficient train for each of the unit segments by identifying, as a target frequency, a fundamental frequency having a high degree of likelihood of corresponding to the target component from among a plurality of fundamental frequencies identified, for each of the unit segments, with regard to frequency components included within the particular frequency band range of the audio signal and set, to the pass value, each of the basic coefficient values corresponding to each of other fundamental frequencies than the target frequency among the plurality of fundamental frequencies and harmonics frequencies of each of the other fundamental frequencies.

5. The audio processing apparatus as claimed in claim 4, wherein said processor is configured to:

identify, for each of the unit segments, a plurality of fundamental frequencies of the frequency components included within the particular frequency band range of the audio signal;

identify a time series of the target frequencies from among the plurality of fundamental frequencies, identified for each of the unit segments, through a path search based on a dynamic programming scheme; and process the basic coefficient train in such a manner that the basic coefficient values corresponding to the other fundamental frequencies than the identified target frequencies, among the plurality of fundamental frequencies, and harmonics frequencies of each of the other fundamental frequencies are each set at the pass value.

6. The audio processing apparatus as claimed in claim 5, wherein said processor is configured to:

calculate a degree of likelihood with which a frequency component corresponds to any one of the fundamental frequencies of the audio signal and selects, as fundamental frequencies, a plurality of frequencies having a high degree of the likelihood, and calculate, for each of the fundamental frequencies, a first probability corresponding to the degree of likelihood, and identifies a time series of the target frequencies through a path search using the first probability calculated for each of the fundamental frequencies.

7. The audio processing apparatus as claimed in claim 5, wherein said processor is further configured to:

identify a time series of the fundamental frequencies, on the basis of the plurality of fundamental frequencies for each of the unit segments, through a path search based on a dynamic programming scheme; and determine, for each of the unit segments, presence or absence of the target component in the unit segment, and wherein, of the identified time series of the fundamental frequencies, a fundamental frequency of each of the unit segments for which said second processing section has affirmed presence therein of the target component is identified as the target frequency.

8. The audio processing apparatus as claimed in claim 7, which further comprises a storage section storing therein a time series of reference tone pitches, and wherein said processor is further configured to:

calculate, for each of the unit segments, a tone pitch likelihood corresponding to a difference between each of the identified plurality of fundamental frequencies for the unit segment and the reference tone pitch corresponding to the unit segment, identify, for each of the plurality of fundamental frequencies, an estimated train through a path search using the tone pitch likelihoods, and identify a state train through a path search using probabilities of a sound-generating state and a non-sound-generating state calculated for each of the unit segments in accordance with the tone pitch likelihoods corresponding to the fundamental frequencies on the estimated path.

9. The audio processing apparatus as claimed in claim 4, wherein said processor is further configured to:

calculate, for each of the unit segments, a characteristic index value indicative of similarity and/or dissimilarity between an acoustic characteristic of each of harmonics structures corresponding to the plurality of fundamental frequencies and an acoustic characteristic corresponding to the target component, and calculate, for each of the fundamental frequencies, a second probability corresponding to the characteristic index value and identify a time series of the target frequencies through a path search using the second probability calculated for each of the fundamental frequencies.

10. The audio processing apparatus as claimed in claim 9, wherein said processor is further configured to calculate, for adjoining ones of the unit segments, third probabilities with which transitions occur from individual fundamental frequencies of one of the adjoining unit segments to fundamental frequencies of another one of the unit segments, immediately following the one of the adjoining unit segments, in accordance with differences between respective ones of the fundamental frequencies of the adjoining unit segments, and then identify a time series of the target frequencies through a path search using the third probabilities.

11. The audio processing apparatus as claimed in claim 1, wherein said processor is configured to determine presence or absence of the target component per analysis portion comprising a plurality of the unit segments and generate the processing coefficient train where all of the coefficient values are set at the pass value for the unit segments within each of the analysis portions for which the presence therein of the target component has been negated.

12. An audio processing apparatus for generating, for each of unit segments of an audio signal, a processing coefficient train having coefficient values set for individual frequencies such that a target component of the audio signal is suppressed, said audio processing apparatus comprising:

a processor configured to:

generate a basic coefficient train where basic coefficient values corresponding to individual frequencies included within a particular frequency band range are each set at a suppression value that suppresses the audio signal while basic coefficient values corresponding to individual frequencies outside the particular frequency band range are each set at a pass value that maintains the audio signal; and generate the processing coefficient train for each of the unit segments by changing to the pass value, each of the basic coefficient values included in the generated basic coefficient train and corresponding to individual frequencies other than the target component among said basic coefficient values corresponding to the individual frequencies included within the particular frequency band range;

a storage section storing therein a time series of reference tone pitches, and a correction section which corrects a fundamental frequency, indicated by frequency information, by a factor of 1 divided by 1.5 when the fundamental frequency indicated by the frequency information is within a predetermined range including a frequency that is one and half times as high as the reference tone pitch at a time point corresponding to the frequency information and which corrects the fundamental frequency, indicated by the frequency information, by a factor of 1 divided by 2 when the fundamental frequency is within a predetermined range including a frequency that is two times as high as the reference tone pitch.

13. A computer-implemented method for generating, for each of unit segments of an audio signal, a processing coefficient train having coefficient values set for individual frequencies such that a target component of the audio signal is suppressed, said method comprising:

a step of generating a basic coefficient train where basic coefficient values corresponding to individual frequencies within a particular frequency band range are each set at a suppression value that suppresses the audio signal while basic coefficient values corresponding to individual frequencies outside the particular frequency band range are each set at a pass value that maintains the audio signal;

a step of processing the generated basic coefficient train in such a manner that, when a sound generation point of any one of frequency components included within the particular frequency band range is detected, the basic coefficient values corresponding to a frequency of the one frequency component are each set at the pass value over a predetermined time period from the detected sound generation point; and a step of generating the processing coefficient train for each of the unit segments by changing, to the pass value, each of the basic coefficient values included in the processed basic coefficient train and corresponding to individual frequencies other than the target component among said basic coefficient values corresponding to individual frequencies within the particular frequency band range.

14. A non-transitory computer-readable storage medium storing a group of instructions for causing a computer to perform a method for generating, for each of unit segments of an audio signal, a processing coefficient train having coefficient values set for individual frequencies such that a target component of the audio signal is suppressed, said method comprising:

a step of generating a basic coefficient train where basic coefficient values corresponding to individual frequencies within a particular frequency band range are each set at a suppression value that suppresses the audio signal while coefficient values corresponding to individual frequencies outside the particular frequency band range are each set at a pass value that maintains the audio signal;

a step of processing the generated basic coefficient train in such a manner that, when a sound generation point of any one of frequency components included within the particular frequency band range is detected, the basic coefficient values corresponding to a frequency of the one frequency component are each set at the pass value over a predetermined time period from the detected sound generation point; and a step of generating the processing coefficient train for each of the unit segments by changing, to the pass value, each of the coefficient values included in the processed basic coefficient train and corresponding to individual frequencies other than the target component among said basic coefficient values corresponding to individual frequencies within the particular frequency band range.

* * * * *